US010567694B2

(12) United States Patent
Park et al.

(10) Patent No.: US 10,567,694 B2
(45) Date of Patent: Feb. 18, 2020

(54) ELECTRONIC APPARATUS AND METHOD FOR CONTROLLING SOUND OF ELECTRONIC APPARATUS

(71) Applicant: SAMSUNG ELECTRONICS CO., LTD., Suwon-si (KR)

(72) Inventors: Da-hye Park, Suwon-si (KR);
Pil-Seung Yang, Suwon-si (KR);
Chan-hong Min, Yongin-si (KR);
Sung-wook Baek, Seoul (KR);
Young-ah Seong, Seoul (KR); Say Jang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/084,638

(22) Filed: Mar. 30, 2016

(65) Prior Publication Data

US 2016/0353050 A1    Dec. 1, 2016

Related U.S. Application Data

(60) Provisional application No. 62/166,935, filed on May 27, 2015.

(30) Foreign Application Priority Data

Aug. 10, 2015  (KR) ........................ 10-2015-0112500

(51) Int. Cl.
*H04N 5/44*      (2011.01)
*H04N 5/445*     (2011.01)
(Continued)

(52) U.S. Cl.
CPC ....... *H04N 5/44513* (2013.01); *H04N 5/4403* (2013.01); *H04N 5/44582* (2013.01);
(Continued)

(58) Field of Classification Search
CPC ............. H04N 5/44513; H04N 5/4403; H04N 5/44582; H04N 5/44591; H04N 5/50;
(Continued)

(56) References Cited

U.S. PATENT DOCUMENTS 6,272,680 B1 *  8/2001  Gaughan ............. H04N 5/4401
                                                         348/565
7,047,548 B2    5/2006  Bates et al.
(Continued)

FOREIGN PATENT DOCUMENTS

CN           1859046 A    11/2006
CN         101647272 A     2/2010
(Continued)

OTHER PUBLICATIONS

Search Report dated Sep. 1, 2016 issued by the International Searching Authority in counterpart International Application No. PCT/KR2016/004115 (PCT/ISA/210).
(Continued)

*Primary Examiner* — Trang U Tran
(74) *Attorney, Agent, or Firm* — Sughrue Mion, PLLC

(57) ABSTRACT

An electronic apparatus and a method for controlling the sound of the electronic apparatus are provided. The electronic apparatus includes: a display configured to display content; a speaker configured to output sound; a communicator configured to receive information from an external remote control device; and a controller configured to control the display, the speaker, and the communicator, wherein the controller is configured to, in response to the communicator receiving first control information from the remote control device while the display displays first content and the speaker outputs a first sound corresponding to the first content, control the display to display second content and control the speaker to continuously output the first sound.

13 Claims, 30 Drawing Sheets

(51) Int. Cl.
  *H04N 5/60*     (2006.01)
  *H04N 5/50*     (2006.01)
  *H04N 21/439*   (2011.01)
  *H04N 21/438*   (2011.01)
  *H04N 21/485*   (2011.01)
  *H04N 21/422*   (2011.01)
  *H04N 21/414*   (2011.01)

(52) U.S. Cl.
  CPC ........... *H04N 5/44591* (2013.01); *H04N 5/50* (2013.01); *H04N 5/60* (2013.01); *H04N 21/41407* (2013.01); *H04N 21/422* (2013.01); *H04N 21/439* (2013.01); *H04N 21/4383* (2013.01); *H04N 21/4396* (2013.01); *H04N 21/4852* (2013.01); *H04N 2005/44517* (2013.01)

(58) Field of Classification Search
  CPC .. H04N 5/60; H04N 21/41407; H04N 21/422; H04N 21/4383; H04N 21/439; H04N 21/4396; H04N 21/4852; H04N 21/433; H04N 21/4147
  USPC ................ 348/734, 565, 564, 569, 731, 738
  See application file for complete search history.

(56) References Cited

U.S. PATENT DOCUMENTS

| | | | |
|---|---|---|---|
| 7,532,253 B1 | 5/2009 | Greenberg | |
| 7,712,117 B1* | 5/2010 | Mohr | H04N 5/44543 |
| | | | 348/563 |
| 7,768,578 B2* | 8/2010 | Jung | H04N 5/268 |
| | | | 348/554 |
| 7,982,806 B2* | 7/2011 | Otsuka | H04N 5/45 |
| | | | 348/565 |
| 8,763,040 B2* | 6/2014 | Shin | H04N 5/44591 |
| | | | 348/725 |
| 9,219,946 B2* | 12/2015 | Bae | H04N 21/4622 |
| 9,386,342 B2* | 7/2016 | Kang | H04N 21/4334 |
| 2006/0197834 A1 | 9/2006 | Balanica | |
| 2006/0250528 A1 | 11/2006 | Jung | |
| 2008/0307452 A1 | 12/2008 | Kim et al. | |
| 2010/0037257 A1 | 2/2010 | Jacobson et al. | |
| 2013/0002967 A1* | 1/2013 | Yun | H04N 5/4403 |
| | | | 348/734 |
| 2014/0250477 A1 | 9/2014 | Kang et al. | |
| 2014/0250488 A1 | 9/2014 | Kang et al. | |

FOREIGN PATENT DOCUMENTS

| | | |
|---|---|---|
| CN | 104038795 A | 9/2014 |
| EP | 2775727 A1 | 9/2014 |
| JP | 2000-11488 A | 1/2000 |
| JP | 2010-87979 A | 4/2010 |
| KR | 1020050073009 A | 7/2005 |
| KR | 10-2005-0117383 A | 12/2005 |
| KR | 1020090074632 A | 7/2009 |
| WO | 2008/056920 A2 | 5/2008 |

OTHER PUBLICATIONS

Written Opinion dated Sep. 1, 2016 issued by the International Searching Authority in counterpart International Application No. PCT/KR2016/004115 (PCT/ISA/237).

Communication dated Dec. 18, 2019, issued by the State Intellectual Property Office of P.R. China in counterpart Chinese Application No. 201680030743.0, 20 pages with translation.

* cited by examiner

ELECTRONIC APPARATUS AND METHOD FOR CONTROLLING SOUND OF ELECTRONIC APPARATUS

CROSS-REFERENCE TO RELATED APPLICATIONS

This application claims priority from U.S. Provisional Application No. 62/166,935, filed on May 27, 2015 in the United States Patent and Trademark Office, and Korean Patent Application No. 10-2015-0112500, filed on Aug. 10, 2015 in the Korean Intellectual Property Office, the disclosure of which is incorporated herein by reference in its entirety.

BACKGROUND

1. Field

Apparatuses and methods consistent with exemplary embodiments relate to controlling the sound of the electronic apparatus, and more specifically, to an electronic apparatus configured to display a second channel on a screen and output a first sound corresponding to a first channel displayed prior to the second channel through a speaker, and a method for controlling the sound of the electronic apparatus.

2. Description of the Related Art

With the development of the technology, functions of electronic apparatuses have become complicated and diversified. Specifically, an electronic apparatus is able to output contents downloaded externally, such as video, and perform Internet browsing.

The electronic apparatus frequently displays in-program commercial break during broadcast of a broadcast channel (e.g., sports game). When the in-program commercial break is displayed, a user may change the current channel of the electronic apparatus to another channel. However, the user cannot know when the in-program commercial break ends even if the user still wants to view the previously viewed broadcast channel. Thus, a user who does not want to view the in-program commercial break in the previous channel needs to check whether the in-program commercial break is finished by repeatedly changing between the new channel and the previous channel (e.g., in-program commercial break).

SUMMARY

Exemplary embodiments of the present disclosure overcome the above disadvantages and other disadvantages not described above. Also, the exemplary embodiments are not required to overcome the disadvantages described above, and an exemplary embodiment of the present disclosure may not overcome any of the problems described above.

According to an aspect of an exemplary embodiment, there is provided an electronic apparatus including: a display configured to display content; a speaker configured to output sound; a communicator configured to receive information from an external remote control device; and a controller configured to control the display, the speaker, and the communicator, wherein the controller is configured to, in response to the communicator receiving first control information from the remote control device while the display displays first content and the speaker outputs a first sound corresponding to the first content, control the display to display second content and control the speaker to continuously output the first sound.

The communicator may include an optical receiver, and the controller may be configured to control the optical receiver to receive the first control information.

The controller may be configured to control the display to display a pop-up window together with the second content in response to the communicator receiving the first control information.

The controller may be configured to control the display to display the pop-up window to be overlapped with the second content in response to the communicator receiving the first control information.

The controller may be configured to, in response to the communicator receiving second control information from the remote control device, control the display to display a pointer that can move on the display according to a movement of the remote control device.

The communicator may include an optical receiver, and the controller may be configured to control the optical receiver to receive the second control information.

The second control information may include control information corresponding to the movement of the remote control device.

The controller may be configured to, in response to the communicator receiving third control information received from the remote control device, control the display to display the first content and control the speaker to continuously output the first sound.

The controller may be configured to control in response to the communicator receiving fourth control information received from the remote control device, control the display to continuously display the second content and control the speaker to output second sound corresponding to the second content.

The controller may be configured to control an external speaker, which is connected to the electronic apparatus in a wired or wireless manner, to output the first sound.

According to an aspect of another exemplary embodiment, there is provided a remote control device including: a button; a sensor configured to detect movement of the remote control device; a communicator configured to transmit information to an electronic apparatus; and a controller configured to control the sensor and the communicator, wherein the controller is configured to control the transmitter to transmit first control information corresponding to selection of the button and second control information corresponding to the movement of the remote control device detected by the sensor, to the electronic apparatus to control content displayed by the electronic apparatus and sound output by the electronic apparatus, and wherein at least one of the first control information and the second control information instructs the electronic apparatus to switch from displaying first content to displaying second content and continuously output first sound corresponding to first content.

The communicator may include an optical transmitter, and the controller may be configured to control the optical transmitter to transmit at least one of the first control information and the second control information to the electronic apparatus.

The button may include one dedicated button or a combination of a plurality of buttons.

According to an aspect of another exemplary embodiment, there is provided an electronic apparatus including: a display configured to display content; a speaker configured to output sound; an input/output interface connected to an audio apparatus; a communicator configured to receive information from a remote control device; and a controller configured to control the display, the speaker, the input/output interface, and the receiver, wherein the controller is configured to, in response to receiving first control information from the audio apparatus and receiving second control information from the remote control device while the display displays first content and the speaker and the audio apparatus output a first sound corresponding to the first content, control the display to display second content, control the speaker to output a second sound corresponding to the second content, and control the audio apparatus to continuously output the first sound.

The first control information may correspond to a first input detected by a sensor of the audio apparatus, and the controller may be configured to control one of the input/output interface and the communicator to receive the first control information.

The communicator may include an optical receiver, the second control information may correspond to a second input received by a button of the remote control device, and the controller may be configured to control the optical receiver to receive the first control information.

The controller may be configured to control the display to display the first content in response to third control information received from the audio apparatus, control the speaker to continuously output the first sound corresponding to the first content, and control the audio apparatus to continuously output the first sound.

BRIEF DESCRIPTION OF THE DRAWINGS

The above and/or other aspects of the present disclosure will be more apparent by describing certain exemplary embodiments present disclosure with reference to the accompanying drawings, in which.

DETAILED DESCRIPTION OF EXEMPLARY EMBODIMENTS

Figure 1:
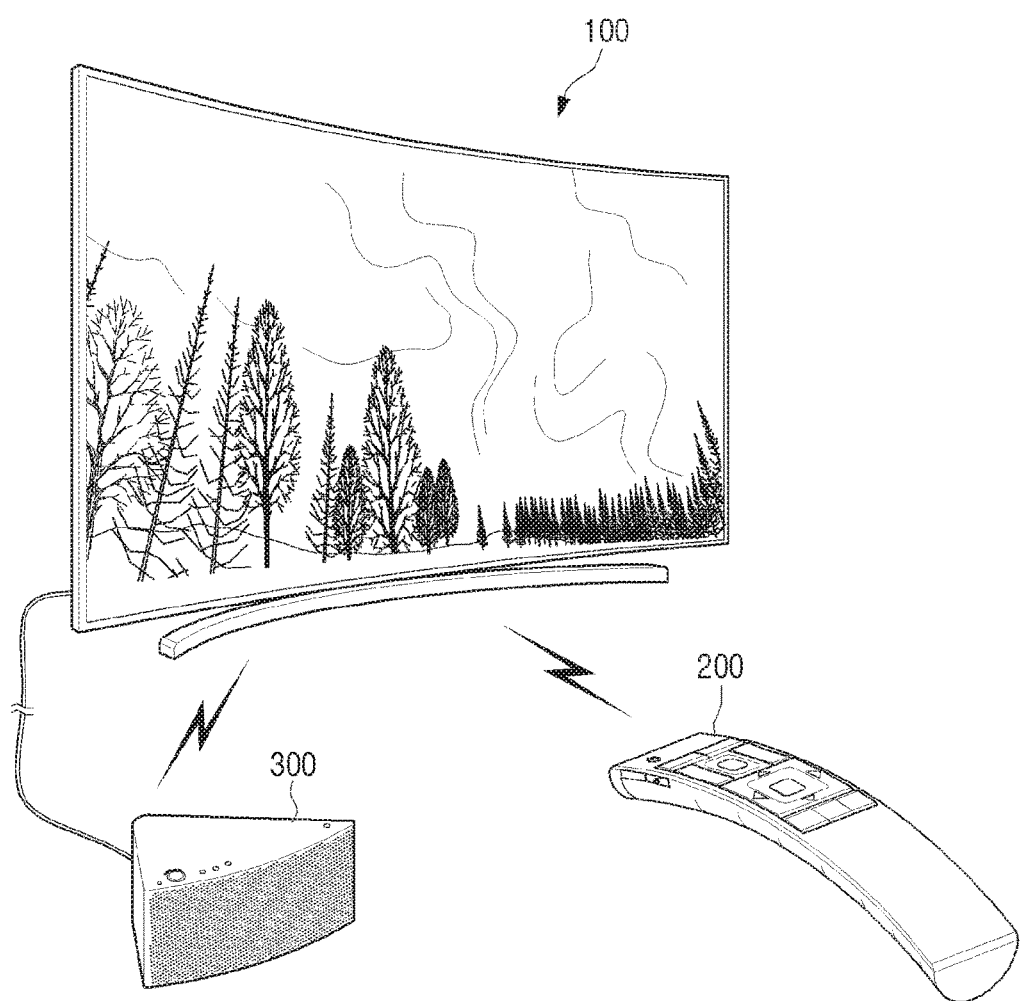
FIG. 1 is a diagram schematically illustrating operation between an electronic apparatus, a remote control device, and an audio apparatus according to an exemplary embodiment.

Certain exemplary embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present disclosure. Accordingly, it is apparent that the exemplary embodiments of the present disclosure can be carried out without those specifically defined matters. Also, well-known functions or constructions are not described in detail since they would obscure the invention with unnecessary detail.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Terminology including an ordinal number such as "first," "second," and so on may be used to describe a variety of constituent elements, but the elements are not limited by the terminology. The terms are used only to distinguish one element from another. For example, without departing from the scope of the present disclosure, a first element may be named a "second element" or similarly, the second element may be named a "first element". The expression "and/or" includes any one item among a combination of a plurality of related items or among a plurality of related items.

Throughout the description, the expression "select(ing) a key (or button)" of a remote controller 200 as used herein may refer to "press(ing) or touch(ing) a key (or button)".

The expression "user input" as used herein may refer to a concept that includes, for example, user's selecting a key (or button), pressing a key (or button), touching a key, or making a touch gesture, voice or motion. Further, for the remote controller 200, a "touch" (including touch gesture) may be input by a user's body or input pen (e.g., stylus).

According to an exemplary embodiment, the "screen" of an electronic apparatus as used herein may include a display of the electronic apparatus.

According to an exemplary embodiment, the expression "sound" or "audio" as used herein may indicate sound data corresponding to the sound or audio (e.g., music data, voice data and so on). Further, the expression "sound" or "audio" as used herein may indicate sound files corresponding to the sound or audio (e.g., music files, voice files, and so on).

According to an exemplary embodiment, a "sound stay" function may be a function to change a first broadcast channel displayed on the screen of the electronic apparatus to a second broadcast channel but maintain output of the sound corresponding to the first broadcast channel instead of the sound corresponding to the second broadcast channel. For example, an in-program commercial break may be displayed while the first broadcast channel (e.g., boxing game at a sports channel) is displayed on the screen of the electronic apparatus. When the in-program commercial break is displayed on the electronic apparatus, a user may change the first broadcast channel to the second broadcast channel (e.g., to a news channel). When changed to the second broadcast channel, the electronic apparatus may output the sound corresponding to the first broadcast channel (e.g., in-program commercial break) instead of the sound corresponding to the second broadcast channel through a speaker.

The "content" may be displayed on the electronic apparatus (e.g., including the display apparatus). For example, the content may include video files or audio files reproduced by a video player which is one of applications, music files reproduced by a music player, photo files displayed by a photo gallery, or web page files displayed by a web browser. Further, the content may include a received broadcast.

The terminology used herein is for the purpose of describing exemplary embodiments, rather than restricting and/or limiting the present disclosure. In addition, the singular expression does not limit the present disclosure to have singular component or step. Instead, the present disclosure may comprise multiple components or steps even if described in singular expression. The expression such as "comprise" or "have" as used herein is intended to designate existence of a characteristic, number, step, operation, element, part or a combination thereof as specified in the description, and should not be construed as foreclosing possible existence or addition of one or more of the other characteristics, numbers, steps, operations, elements, parts or a combination thereof.

The same reference numerals in the drawings refer to the elements with substantially identical functions.

FIG. 1 is a diagram schematically illustrating operation between an electronic apparatus, a remote control device, and an audio apparatus according to an exemplary embodiment.

Referring to FIG. 1, the electronic apparatus 100, the remote control device 200, and the audio apparatus 300 are shown.

Figure 2A:
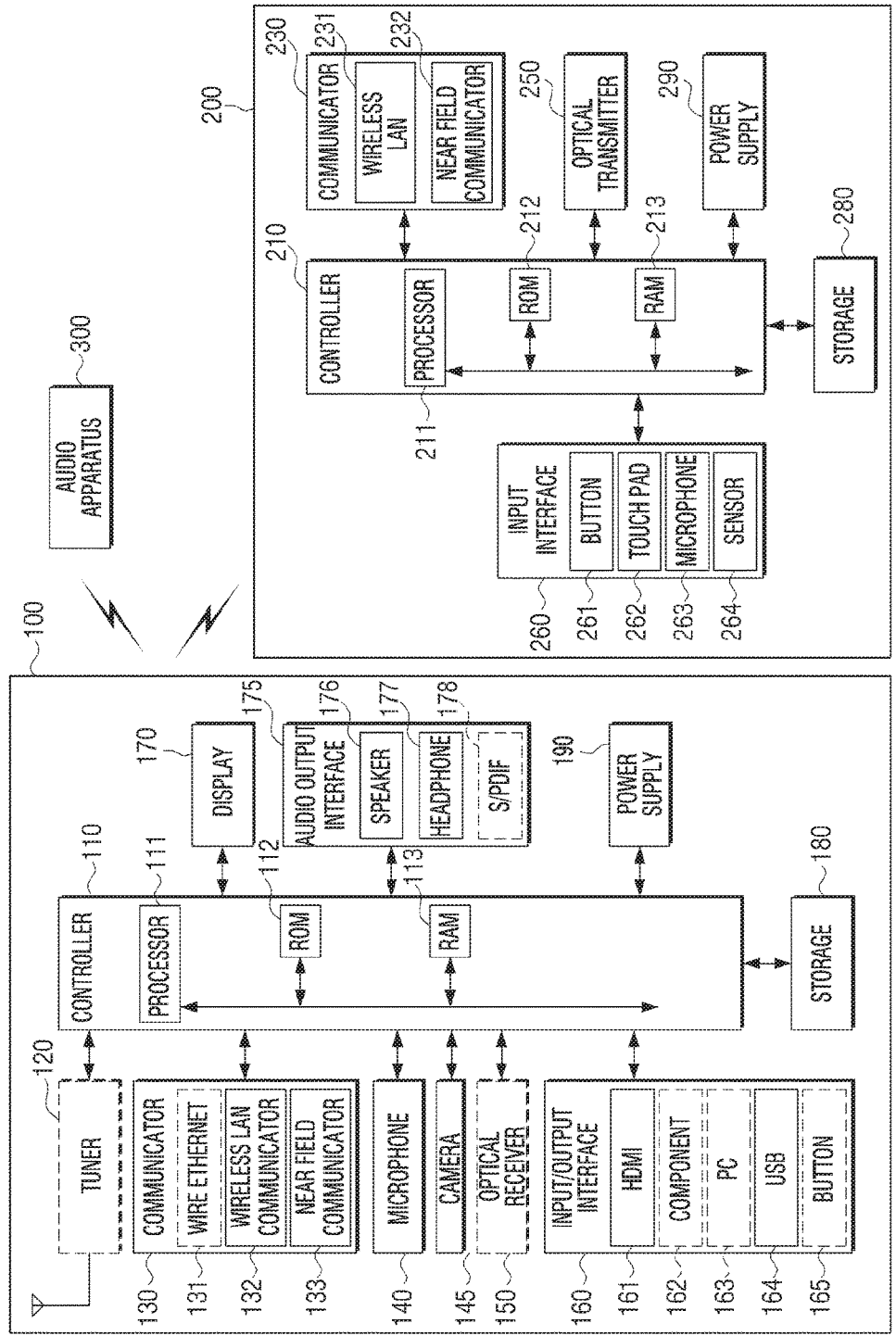
FIGS. 2A and 2B are block diagrams illustrating an electronic apparatus, a remote control device and an audio apparatus according to an exemplary embodiment.

The electronic apparatus 100 may display the content (e.g., broadcast, video, and so on). The remote control device 200 nearby may control the electronic apparatus 100 by transmitting a control command in accordance with a user input through the infrared or the near field communication. A user may control functions of the electronic apparatus 100 (e.g., power on/off, channel changing, volume adjusting or content playback) by using the voice recognition through a button 261 (FIG. 2A), a touch pad 262 (FIG. 2A) and a microphone 263 (FIG. 2A) provided on the remote control device 200 and/or the motion recognition through a sensor 264 (FIG. 2A).

A user may control the functions of the electronic apparatus 100 (e.g., power on/off, channel changing, volume adjusting or content playback) with the motion recognition through a camera 145 (FIG. 2A) provided on the electronic apparatus 100.

The electronic apparatus 100 and the audio apparatus 300 may be connected to each other wirelessly via their communicators 130 and 330. For example, the electronic apparatus 100 and the audio apparatus 300 may be connected to each other in the ad-hoc mode or the infra-structure mode which connects wirelessly through an access point 50.

The wireless communication may be wireless LAN, Bluetooth, Bluetooth low energy, Zigbee, WFD (Wi-Fi Direct), UWB (Ultra WideBand), IrDA (Infrared Data Association), and NFC (Near Field Communication), but not limited thereto.

Further, the audio apparatus 300 may be connected to the electronic apparatus 100 through a cable in a wired manner.

The electronic apparatus 100 may output the audio (e.g., audio data corresponding to a music file) to the audio apparatus 300 through the wireless LAN and the near field communication (e.g., Bluetooth communication, NFC communication, and so on).

The electronic apparatus 100 may transmit the audio (e.g., audio data corresponding to a music file) to an access point which is accessed through the wireless LAN so that the audio apparatus 300 outputs the audio. The audio apparatus 300 may receive the audio (e.g., audio data corresponding to a music file) from the access point and output the same.

The audio apparatus 300 may include a sound bar, which may include a woofer, and one speaker or a plurality of speakers. The audio apparatus (e.g., sound bar, sound bar including the woofer, and one speaker or a plurality of speakers) may be positioned in the same space (e.g., living room at home, one office room, and so on) in which access to one access point is allowed.

The audio apparatus 300 may be implemented to be 2 channel, 2.1 channel, 4 channel, 4.1 channel, 5.1 channel, 6.1 channel, 7.1 channel, 9.1 channel or 11.2 channel, although a person skilled in the art can easily understand that exemplary embodiments may not be limited to herein.

Figure 2B:
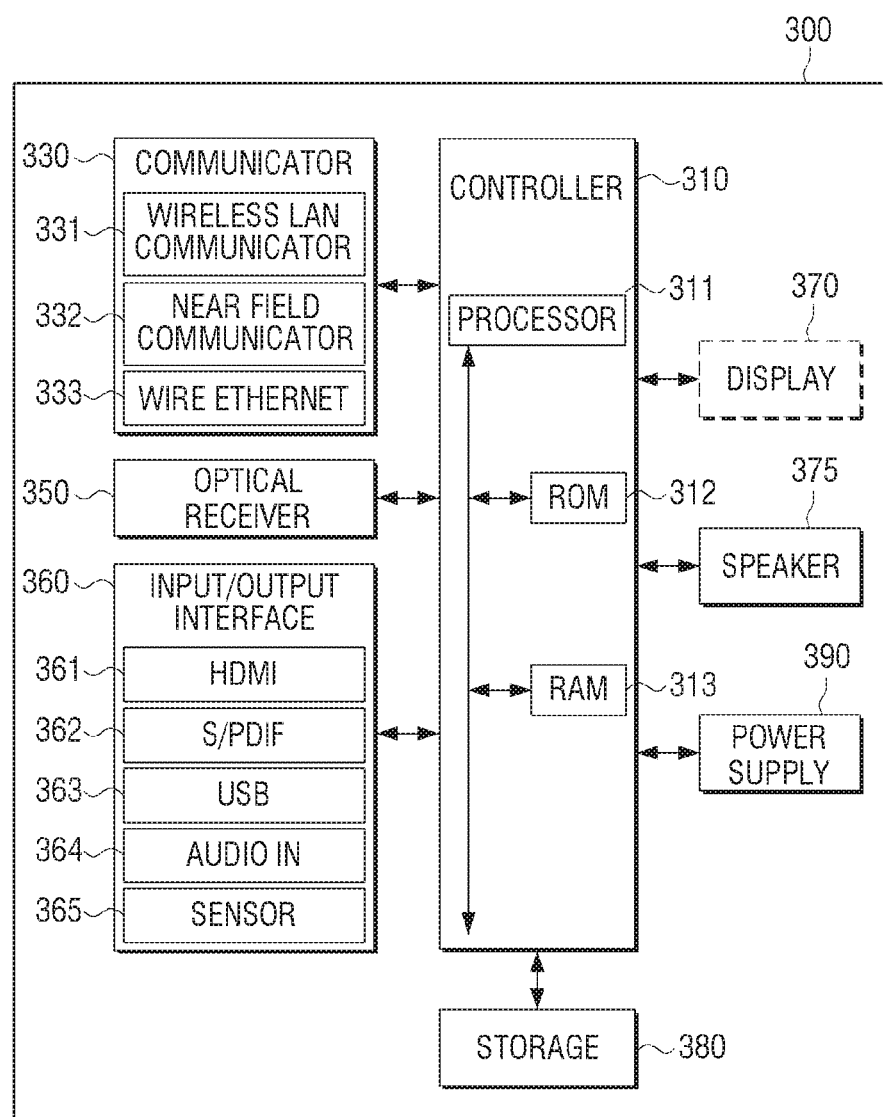

FIGS. 2A and 2B are block diagrams illustrating the electronic apparatus, the remote control device and the audio apparatus according to an embodiment.

Referring to FIG. 2A, the electronic apparatus 100 may be connected to an external device in a wired or wireless manner by using a communicator 230 or an input/output interface 160. The external device may include a mobile phone, a smartphone, a tablet PC, a remote control device 200, an audio apparatus 300 and a server. Further, the electronic apparatus 100 may receive control information from the remote control device 200.

The electronic apparatus 100 may include a display 170, and may download an application externally and install the same.

The electronic apparatus 100 may include a display 170, and additionally include one of a tuner 120, a communicator 130 and an input/output interface 160. The electronic apparatus 100 may include the display 170, and additionally include a combination of the tuner 120, the communicator 130, and the input/output interface 160. Alternatively, the electronic apparatus 100 including the display 170 may be electrically connected to another external electronic apparatus including the tuner.

FIG. 2A illustrates an example in which the electronic apparatus is implemented to include the tuner and the display.

The electronic apparatus 100 may include a tuner 120, a communicator 130, a microphone 140, a camera 145, an input/output interface 160, a display 170, an audio output interface 175, a storage 180 and a power supply 190. The electronic apparatus 100 may include a sensor (e.g., illumination sensor, temperature sensor, and so on) which detects the internal state or the external state of the electronic apparatus 100.

The controller 110 may control general operations of the electronic apparatus 100 and signal flows between the elements 120-190 within the electronic apparatus 100, and process the data. Further, the controller 110 may control the electrical power provided to the elements 120-180 from the power supply 190.

The controller 110 may include a processor 111, a read-only memory (ROM) 112 (or non-volatile memory) storing a control program for the controlling of the electronic apparatus 100 and a random access memory (RAM) 113 (or volatile memory) storing the signals or data input externally and used as storing area corresponding to various operations performed in the electronic apparatus 100. Further, the controller 110 may include an embedded processor including a ROM and/or a RAM.

The processor 111 may include a graphic processing unit for the graphic processing corresponding to the video or the image. The processor 111 may be configured as System On Chip (SoC) including a core and graphics processing unit (GPU). The processor 111 may include a single core, a dual core, a triple core, a quad core or a multiple of the core.

The processor 111 may include a plurality of processors, e.g., a main processor, and a sub processor operating in a sleep mode and/or a sensor processor controlling the sensor.

The processor 111, ROM 112, and RAM 113 may be connected to each other through a bus.

According to an exemplary embodiment, the term "controller 110 of the electronic apparatus" as used herein may include the processor 111, the ROM 112, and the RAM 113 of the electronic apparatus 100.

The constitution and the operation of the controller 110 may be variously implemented according to embodiments, which can be easily understood by a person skilled in the art.

The tuner 120 may tune only to the frequency of the channel in which the electronic apparatus 100 intends to receive among various wave components of the broadcast signals received externally, by signal amplification, mixing, or resonance. The broadcast signals may include the video, the audio, and the additional data (e.g., electronic program guide (EPG)).

The tuner 120 may receive the video, the audio and the data from the frequency bandwidth corresponding to a channel (e.g., cable broadcast #24) according to a user input (e.g., the control information received from the remote control device 200, channel number input, channel up-down input, and so on).

The tuner 120 may include a plurality of tuners (e.g., first tuner, second tuner, not illustrated). Further, the tuner 120 may operate as a first tuner module and a second tuner module which are implemented to be software programs under control of the controller 110.

The tuner 120 may receive broadcast signals from various sources such as ground wave broadcast, cable broadcast, satellite broadcast, internet broadcast, and so on. Further, the tuner 120 may receive broadcast signals from sources, such as analog broadcast or digital broadcast.

The tuner 120 may be embedded within the electronic apparatus 100 or implemented as a separate device including the tuner unit electrically connected to the electronic apparatus 100 (e.g., set-top box). Further, the tuner 120 may be configured as tuner connected to the input/output interface 160.

The communicator 130 may connect the electronic apparatus 100 to an external device (e.g., remote control device, audio apparatus or server) under control of the controller 110. The controller 110 may download an application from another electronic apparatus through the communicator 130 or perform web browsing. Further, the communicator 130 may receive the control information from the remote control device 200 under control of the controller 110.

The communicator 130 may include a wired Ethernet 131, a wireless local area network (LAN) communicator 132, a near field communicator 133 and/or an optical receiver 150 according to the performance and the constitution of the electronic apparatus 100.

The microphone 140 may receive the voice uttered by a user. The microphone 140 may change the received voice into the electrical signal, and output the electrical signal to the controller 110. The user voice may include the voice corresponding to the control the menu or the function of the electronic apparatus 100.

The microphone 140 may be incorporated within the electronic apparatus 100 or separate from the electronic apparatus 100. The separate microphone 140 may be electrically connected to the electronic apparatus 100 through the communicator 130 or the input/output interface 160.

The camera 145 may receive the video (e.g., consecutive frames) corresponding to the user motion including the gesture within the identified range of the camera. The user motion may include the body part of a user such as face, look, hand, fist, and finger or the motion of the user body part.

The camera 145 may convert the received video into the electrical signal under control of the controller 110, and output the electrical signal to the controller 110. The controller 110 may display the menu on the electronic apparatus 100 by using the motion recognition result or perform controlling (e.g., channel adjusting or volume adjusting) corresponding to the motion recognition result.

When the camera 145 is implemented with plurality of cameras, three dimensional still images or three dimensional motion may be received by using the first camera on the front of the electronic apparatus 100 and the neighbored second camera (e.g., the interval between the optical axis of the first camera and the optical axis of the second camera is more than 1 cm and less than 8 cm).

The camera 145 may be configured separately from the electronic apparatus 100 as well as all-in-one with the electronic apparatus 100. The separate camera may be electrically connected to the electronic apparatus 100 through the communicator 130 or the input/output interface 160.

The optical receiver 150 may receive the optical signal including the control information output from the remote control device 200 through an optical window. The optical receiver 150 may receive the optical signal corresponding to a user input (e.g., touching, pressing, touch gestures, voice or motion) from the remote control device 200. The control information may be detected from the received optical signal. The control information detected from the received optical signal may be transmitted to the controller 110.

The input/output interface 160 may transmit or receive the content externally from the electronic apparatus 100 under control of the controller 110. The input/output interface 160 may include one of a High-Definition Multimedia Interface (HDMI) input port 261, a component input jack 262, a PC input port 263 and a Universal Serial Bus (USB) input jack 264. The input/output interface 160 may include a combination of HDMI input port 261, the component input jack 262, PC input port 263, and USB input jack 264.

The input/output interface 160 may include the button 165. The button 165 may include the power button, the volume removal button, the volume adjustment button, or the channel change button. The button 165 may include the home button 165*a*, the previously implementing application button 165*b*, and/or the return button 165*c*.

The above described elements included in the input/output interface 160 may be modified, added and/or deleted correspondingly to the electronic apparatus 100, which can be easily understood by a person skilled in the art.

The display 170 may display the video included in the broadcast signal received through the tuner 120 under control of the controller 110. The display 170 may display the video input through the communicator 130 or the input/output interface 160.

The display 170 may output the video stored in the storage 180 under control of the controller 110. Further, the display 170 may display a voice UI (User Interface, UI to be referred below, e.g., a voice command guide is included) to perform the voice recognition task corresponding to the voice recognition or a motion UI (e.g., a user motion guide for the motion recognition is included) to perform the motion recognition task corresponding to the motion recognition.

The screen of the electronic apparatus 100 according to an embodiment may include the display 170 of the electronic apparatus 100.

The audio output interface 175 may output the audio (e.g., audio data corresponding to the audio) included in the broadcast signal received through the tuner 120 under control of the controller 110. The audio output interface 175 may output the audio (e.g., audio data corresponding to the audio) input through the communicator 130 or the input/output interface 160. Further, the audio output interface 175 may output the audio (e.g., audio data corresponding to the audio) stored in the storage 180 under control of the controller 110.

The audio output interface 175 may include one of the speaker 176, a headphone output component 177 or an S/PDIF (Sony/Philips Digital Interface Format) output component 178. Further, the audio output interface 175 may include a combination of the speaker 176, the headphone output component 177 and the S/PDIF output component 178.

The storage 180 may store various data, programs or applications to drive and control the electronic apparatus 100 under control of the controller 110.

The storage 180 may store the signal or the data input/output according to the driving of the tuner 120, the communicator 130, the microphone 140, the camera 145, the optical receiver 150, the input/output interface 160, the display 170, the audio output interface 175 and the power supply 190. The storage 180 may store a control program for controlling the electronic apparatus 100 and the controller 110, applications provided initially by a manufacturer or downloaded externally, a Graphic User Interface (GUI) related with the applications, objects to provide GUI (e.g., image, text, icon, and button), user information, documents, a database, or relevant data.

According to an exemplary embodiment, the term "storage" may include the storage 180 of the electronic apparatus 100, the ROM 112 and the RAM 113 of the controller 110, and a memory card attached to the electronic apparatus 100 (e.g., a micro SD card or a USB memory). Further, the storage may include the non-volatile memory, the volatile memory, the hard disk drive (HDD), or the solid state drive (SDD).

The storage 180 may include broadcast receiving module, channel controlling module, volume controlling module, communication controlling module, voice recognition module, motion recognition module, optical receiving module, display controlling module, audio controlling module, externally input controlling module, electrical power controlling module, voice database or motion database, which are not illustrated herein. Modules and database of the storage 180 may be configured as software format in order to perform the control function of the broadcast receiving, the channel control function, the volume control function, the communication control function, the voice recognition function, the motion recognition function, the optical receiving function, the display control function, the audio control function, the externally input control function, or the electrical power control function. The controller 110 may perform the functions of the electronic apparatus 100 by executing the above software stored in the storage 180.

The storage 180 may store electronic apparatus information, remote control device information and/or audio apparatus information.

The storage 180 may store the first, the second, the third, the fourth, and/or the #12 control information received from the remote control device.

The storage 180 may store the control information received from the audio apparatus 300.

According to an exemplary embodiment, the term "storage" as used herein may include the storage 180, the ROM 112 and the RAM 113 of the controller 110, the storage configured as a SoC, and/or the memory card attached to the electronic apparatus 100 (e.g., a micro SD card or a USB memory, not illustrated). Further, the storage may include the non-volatile memory, the volatile memory, an HDD or an SDD.

The power supply 190 may supply power input from the external power source to the internal elements 120 to 180 of the electronic apparatus 100 under control of the controller 110. Further, the power supply 190 may supply power input from one or more batteries positioned within the electronic apparatus 100 to the internal elements 120-180 under control of the controller 110.

At least one of the elements (e.g., 120 to 190) illustrated in the electronic apparatus 100 of FIGS. 1 and 2A may be modified, added or omitted according to the actual implementation of the electronic apparatus 100. Further, the positions of the elements (e.g., 120 to 190) may be modified according to the actual implementation of the performance or the constitution of the electronic apparatus 100.

Referring to FIG. 2A, the remote control device 200, remotely controlling the electronic apparatus 100, may include the controller 210, the communicator 230, the input interface 260, the storage 280 and the power supply 290. Further, the remote control device 200 may not include the storage 280.

The remote control device 200 may be another electronic device that can control the electronic apparatus 100. The remote control device 200 may be an apparatus which installs an application for controlling the electronic apparatus 100 to control the electronic apparatus 100. The remote control device 200 that can install the application for controlling the electronic apparatus 100 may include the display (e.g., touch screen or display panel without the touch panel) and the storage.

The remote control device including the display may include a portable phone, a smartphone, a tablet PC, a laptop PC, another electronic apparatus or a home appliance (e.g., refrigerator, washing machine or cleaning device).

A user may select a function key (e.g., channel key) on a GUI provided from the application, and control the electronic apparatus 100.

The controller 210 may control general operation of the remote control device 200 and signal flows between the internal elements 210 to 290, and perform processing the data. The controller 210 may control the power supply to the internal elements 210 to 280 by using the power supply 290.

The controller 210 may include the processor 211, a ROM 212 (or non-volatile memory) storing a control program for the control of the remote control device 200 and a RAM 213 (or volatile memory) storing the signals or data input externally from the remote control device 200 or used as storing areas regarding various operations performed in the remote control device 200. Further, the processor 211, the ROM 212, and the RAM 213 may be connected to each other through an internal bus.

The controller 210 may include the embedded processor including a ROM and/or a RAM.

According to an exemplary embodiment, the term "controller" may include the processor 211, the ROM 212, and the RAM 213 of the remote control device 200.

The communicator 230 may be wirelessly connected to the electronic apparatus 100 under control of the controller 210. The communicator 230 may transmit the control information corresponding to the user input (e.g., touching, pressing, touch gestures, voice or motion) to the electronic apparatus 100 under control of the controller 210.

The communicator 230 may include a wireless LAN communicator 231, a near field communicator 232, and/or an optical transmitter 250.

The optical transmitter 250 may output an optical signal (e.g., control information) corresponding to the user input (e.g., touching, pressing, touch gestures, voice or motion) to the optical receiver 150 of the electronic apparatus 100 under control of the controller 210.

The remote controller code format used in the remote control device 200 may be one of the manufacturer-specific remote controller code format and the commercial remote controller code format. The remote controller code format may include the leader code and the data word. The output optical signal may be modulated with a carrier wave and output. The control information may be stored in the storage 280 or generated by the controller 210. The remote control device 200 may include infrared-light emitting diode (IR-LED).

The remote control device 200 may include at least one of the wireless LAN communicator 231, the near field communicator 232 and the optical transmitter 250 capable of transmitting the control information for controlling the electronic apparatus 100 (e.g., channel changing or volume adjusting).

The controller 210 may output the control information corresponding to the user input to the electronic apparatus 100 through selected one among the communicator 230 and the optical transmitter 250. Further, the controller 210 may transmit the control information corresponding to the user input to the electronic apparatus 100 with the priority through one of the communicator 230 and the optical transmitter 250.

Although FIG. 2A illustrates that the remote control device 200 includes the wireless LAN communicator 231, the near field communicator 232 and the optical transmitter 250, only one of the above elements may be included according to the implementation. For example, the remote control device may include only IR LED transmitting IR signal.

The input interface 260 may output the electrical signal (e.g., analog signal or digital signal) corresponding to the received user input (e.g., touching, pressing, touch gestures, voice or motion) to the controller 210.

The input interface 260 may include the button 261 or the touch pad 262 which receives a user input (e.g., touching or pressing) for controlling the electronic apparatus 100. The inputter 260 may include the microphone 263 receiving the uttered user voice or the sensor 264 detecting the motion of the remote control device 200. Further, the input interface 260 may include a vibration motor providing the haptic feedback corresponding to the user input.

The button 261 may include one or more than two buttons (or keys) corresponding to the function of the electronic apparatus 100. One or more buttons (or keys) may include the physical button or the touch button.

The touch pad 262 may receive the user touch or the user touch gesture. The touch pad 262 may be positioned on the front of the remote control device 200 to be distinguished from the position of the button 261.

The microphone 263 may receive the uttered user voice.

The sensor 264 may detect the state of the remote control device 200. The sensor 264 may transmit the signal corresponding to the state of the remote control device 200 to the controller 210.

For example, the sensor 264 may include the near field sensor, the illumination sensor, the motion sensor, the gyro sensor, the acceleration sensor, or the gravity sensor.

The vibration motor may change the electrical signal into the mechanical vibration under control of the controller 210. For example, the vibration motor may include a linear vibration motor, a bar type vibration motor, a coin type vibration motor, or a piezoelectric component vibration motor.

The storage 280 may store various data, programs and applications to drive and control the remote control device 200 under control of the controller 210. The storage 280 may store the signal or the data input or output correspondingly to the driving of the power supply 290.

The storage 280 may store the control information corresponding to the received user input (e.g., touching, pressing, touch gestures, voice or motion) under control of the controller 210.

The storage 280 may store the remote control device information corresponding to the remote control device 200. The remote control device information may include a model name, an original device ID, a memory remained amount, whether to store the object data, Bluetooth version or Bluetooth profile.

The storage 280 may store the first control information transmitted to the electronic apparatus 100.

The storage 280 may store the second control information transmitted to the electronic apparatus 100. The second control information may be corresponding to the movement of the remote control device 200.

The storage 280 may store the haptic pattern information corresponding to one or more haptic patterns. The haptic pattern may be expressed as a waveform. The haptic pattern may indicate the vibration time (e.g., the measured unit is 50 ms) of the vibration motor on the horizontal axis and the vibration intensity (e.g., the measured unit is 500 mV) of the vibration motor on the vertical axis. The first haptic pattern may be vibration gradually increasing from 0 V to 800 mV, gradually decreasing to 100 mV, and repeatedly increasing. Further, the acceleration section and the deceleration section may be symmetrical to each other.

The second haptic pattern may be vibration gradually increasing from 0 V to 900 mV, rapidly decreasing to 500 mV, gradually decreasing to 200 mV, and repeatedly increasing. Further, the third haptic pattern may be vibration repeating gradually increasing from 0 V to 950 mV, rapidly decreasing to 100 mV, and then increasing.

When there are a plurality of the haptic patterns, one pattern may be stored as favorite haptic pattern through the establishment among a plurality of the haptic patterns. When the favorite haptic pattern is established, the controller 210 may provide the favorite haptic pattern as a haptic feedback through the vibration motor with the highest priority.

The haptic patterns may be added, modified or deleted correspondingly to the function or the constitution of the remote control device 200.

The power supply 290 may provide power to the elements 210 to 290 of the remote control device 200 under control of the controller 210. The power supply 290 may provide power to the elements 210 to 290 from one or more batteries positioned in the remote control device 200.

At least one element illustrated in the remote control device 200 of FIGS. 1 and 2A may be modified, added or deleted according to the performance of the remote control device 200. Further, the positions of the elements may be modified according to the performance or the constitution of the remote control device 200.

Referring to FIG. 2B, the audio apparatus 300 may be connected in a wired or wireless manner to the electronic apparatus 100 through the communicator 230. The audio apparatus 300 may output the audio data corresponding to the audio received from the electronic apparatus 100 or the access point. The audio apparatus 300 may output the audio streaming received from the electronic apparatus 100 and/or the access point which are connected in a wired or wireless manner.

The audio apparatus 300 may include a controller 310, a communicator 330, an input/output interface 360, a display 370, a speaker 375, a storage 380 and/or a power supply 390.

The controller 310 may control general operations of the audio apparatus 300 and the signal flows between the internal elements 330 to 390 of the audio apparatus 300, and processing data. The controller 310 may control the power provided to the internal elements 330 to 380 from the power supply 390.

The controller 310 may include the processor 311. The controller 310 may include the processor 311 and the ROM 312 storing a control program for controlling the audio apparatus 300. Further, the controller 310 may include the processor 311, the ROM 312, and the RAM 313 storing the signal or data input externally from the audio apparatus 300 and used as storing areas corresponding to various operations performed in the audio apparatus 300. The controller 310 may include an audio codec.

The controller 310 may output the received audio through the speaker. Further, the controller 310 may output the received audio to the additional connected speaker through the communicator 330 or the input/output interface 360.

The constitution and the operation of the controller 310 may be variously implemented according to an exemplary embodiment.

The communicator 330 may be connected to the electronic apparatus 100 in a wired or wireless manner under control of the controller 310. The communicator 330 may receive the audio data corresponding to the audio from the electronic apparatus 100 and/or the access point under control of the controller 310. Further, the communicator 330 may receive the control signal from the access point or the electronic apparatus 100 under control of the controller 310.

The communicator 330 may include a wireless LAN communicator 331, a near field communicator 332, a wire Ethernet 333, and/or an optical receiver 350.

The optical receiver 350 may receive the optical signal (including the control signal) received from the dedicated remote control device. The optical receiver 350 may receive the optical signal corresponding to a user input (e.g., touching, pressing, touch gestures, voice or motion) from the dedicated remote control device. The received optical signal may be converted and transmitted to the controller 310. Further, the control signal may be detected from the received optical signal with the controller 310.

The input/output interface 360 may receive the audio data corresponding to the audio (e.g., sound or music) externally under control of the controller 310. The input/output interface 360 may output the audio data corresponding to the audio (e.g., sound or music) externally under control of the controller 310.

The input/output interface 360 may include an HDMI port 361, an S/PDIF port 362, a USB port 363, and/or an audio-in jack 364.

Further, the input/output interface 360 may include the sensor 365 which detects the state of the audio apparatus 300. For example, the sensor 365 may include a near field sensor, an illumination sensor, a motion sensor, a gyro sensor, an acceleration sensor, and/or a gravity sensor.

The constitution and the operation of the input/output interface 360 may be variously implemented according to an embodiment.

The display 370 may display the video or the text information (e.g., song title, volume, and sound output effect) under control of the controller 310. For example, the display 370 may a liquid crystal display (LCD) panel, an organic light emitting diode (OLED) display, a plasma display panel (PDP), or a vacuum fluorescent display (VFD). The video and/or the text information that can be displayed may be different according to the display method.

The display 370 may display the text, the icon or the symbol (e.g., ▶ corresponding to the reproduce and ■ corresponding to the stop) in response to the external device connected to the audio apparatus 300 in a wired or wireless manner (e.g., electronic apparatus 100 or the memory card) under control of the controller 310.

When the audio apparatus 300 and the electronic apparatus 100 are connected to each other wirelessly, the display 370 may display the text of "BT connected" or "NFC connected" under control of the controller 310.

When the optical signal output from the dedicated remote control device is received by the optical receiver 350 of the audio apparatus 300, the display 370 may display the text, the icon or the symbol corresponding to "Power on" which turns on the audio apparatus 300, "Power off" which turns off the audio apparatus 300, and "Vol +/−" which indicates the adjusted volume amount under control of the controller 310.

The speaker 375 may output the audio received by the controlling of the controller 310. The speaker 375 may output the audio (e.g., voice, music, sound or audio streaming) received through the communicator 330 or the input/output interface 360.

The speaker 375 may be implemented to be 1 channel, 2 channel, or 2.1 channel. Further, the speaker 375 may be implemented to be 4 channel, 4.1 channel, 5.1 channel, 6.1 channel, 7.1 channel, 9.1 channel, or 11.2 channel. However, it may not be limited to the above.

The speaker 375 may output the audio stored in the storage 380 under control of the controller 310. Further, the audio apparatus 300 may output the audio to an external electronic apparatus through the input/output interface 360.

For example, the controller 310 may output the audio to the additional speaker or the electronic apparatus 100.

The storage 380 may store various data and the control program to drive and control the audio apparatus 300 under control of the controller 310. The storage 380 may store the input/output signal or data corresponding to the operations of the communicator 330, the input/output interface 360, the display 370, the speaker 375 and the power supply 390.

The storage 380 may include the non-volatile memory, the volatile memory, an HDD or an SDD.

The storage 380 may store the audio apparatus name information and/or the electronic apparatus information.

The storage 380 may store the image, the symbol and/or the text that can be displayed on the display 370.

The power supply 390 may provide power input from the external electrical power source to the internal elements 330 to 380 of the audio apparatus 300 under control of the controller 310. Further, the power supply 390 may provide power output from one or two or more batteries positioned within the audio apparatus 300 to the internal elements 310 to 390 under control of the controller 310.

At least one element (e.g., 310 to 390) illustrated in the audio apparatus 300 of FIGS. 1 and 2B may be added or omitted according to the actual implementation of the audio apparatus 300. Further, the positions of the elements (e.g., 310 to 390) may be modified according to the performance or the constitution of the audio apparatus 300.

Figure 3A:
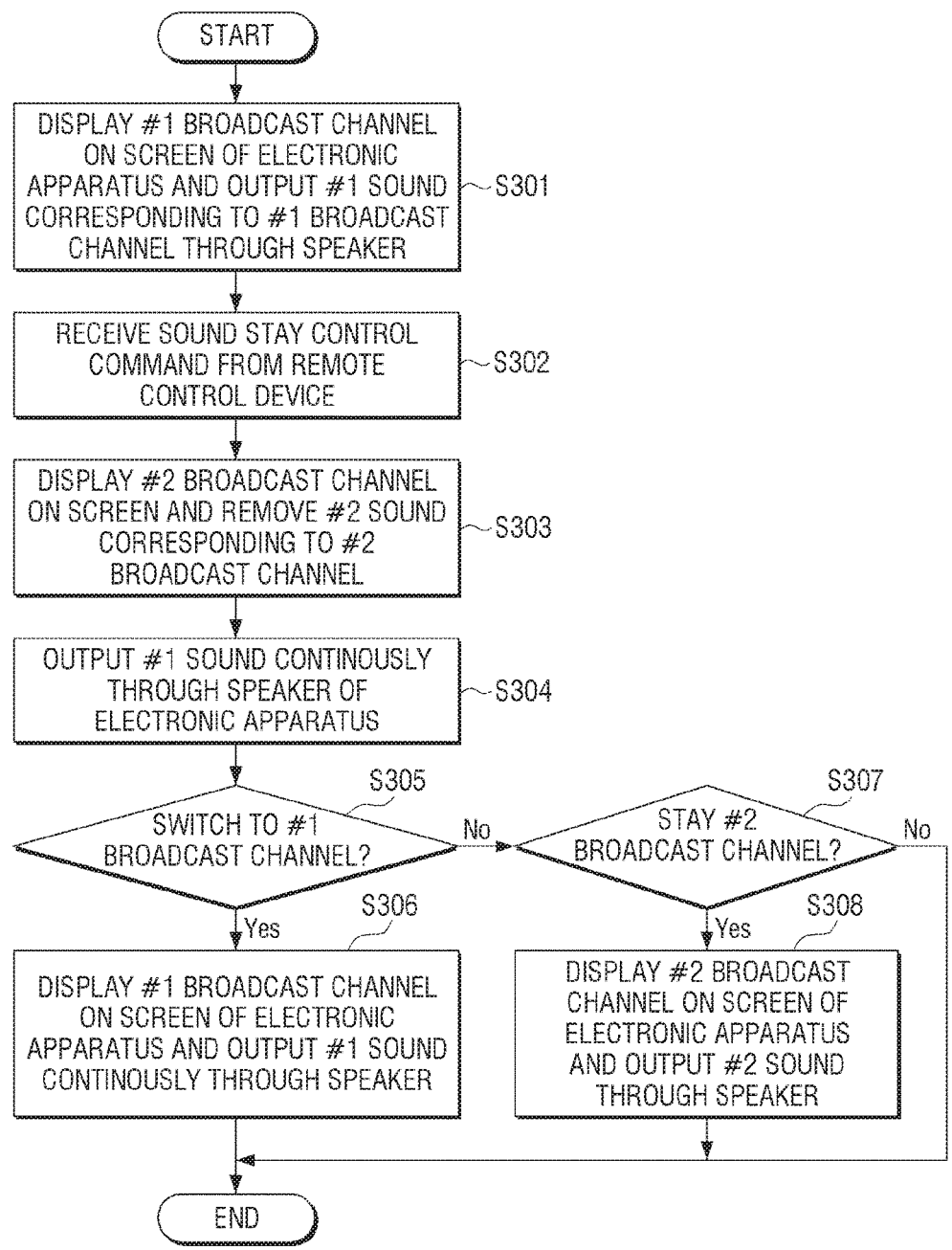
FIG. 3A is a flowchart schematically illustrating a method for controlling the sound of an electronic apparatus according to an exemplary embodiment.

FIG. 3A is a flowchart explaining a method for controlling the sound of the electronic apparatus according to an exemplary embodiment.

FIGS. 4A to 4G are diagrams schematically illustrating examples regarding the method for controlling the sound of the electronic apparatus according to an exemplary embodiment.

At operation S301 of FIG. 3A, a first (#1) broadcast channel may be displayed on the screen of the electronic apparatus, and a first sound corresponding to the first broadcast channel may be output through the speaker.

Figure 4A:
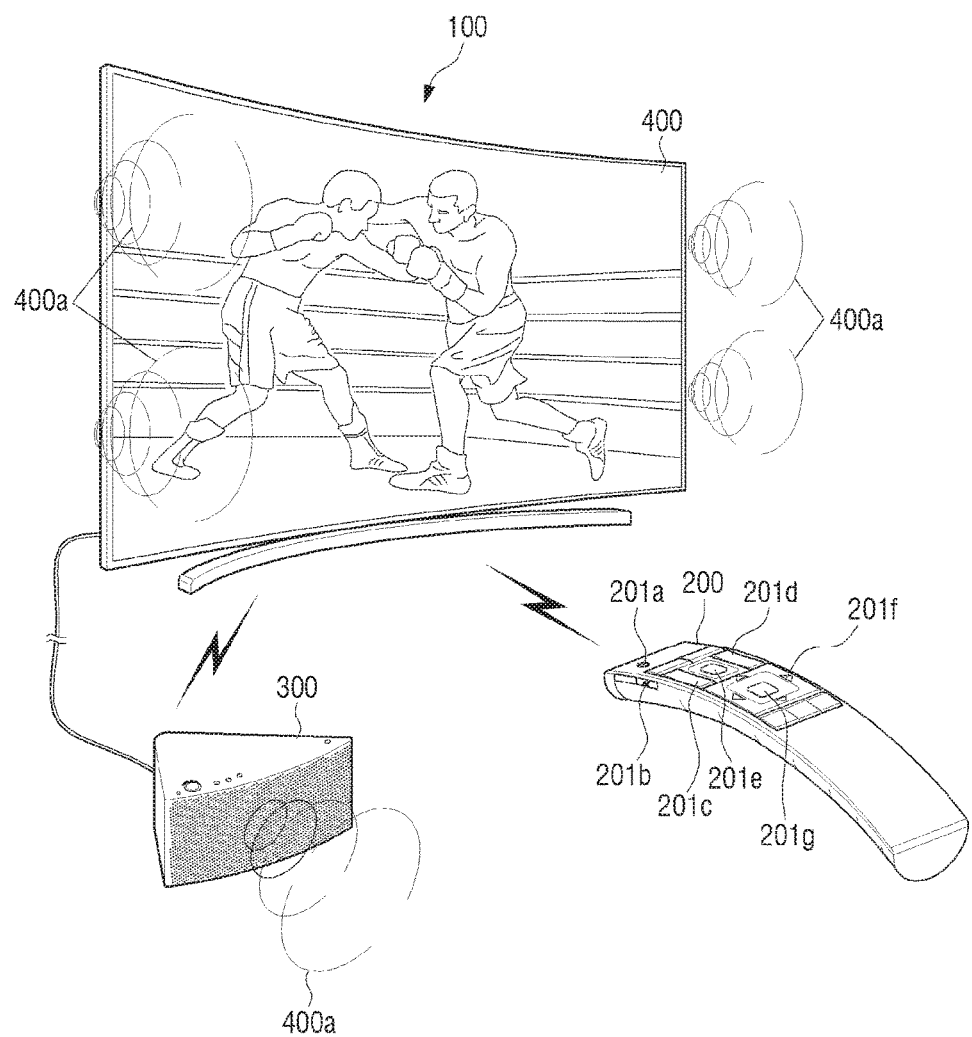
FIGS. 4A to 4G are diagrams schematically illustrating examples regarding a method for controlling the sound of an electronic apparatus according to an exemplary embodiment.

Referring to FIG. 4A, the electronic apparatus 100 may display the first broadcast channel 400 (e.g., boxing game) on the screen 170 and output the first sound 400*a* corresponding to the first broadcast channel through the speaker 176 under control of the controller 110. The first broadcast channel 400 displayed on the screen may be selected by a user input inputted through one of the remote control device 200 and the electronic apparatus 100.

In response to the selection of the first broadcast channel of a user, the controller 110 may receive the broadcast signal corresponding to the first broadcast channel through a first tuner. The controller 110 may output the video 400 corresponding to the first broadcast channel on the display 170. The controller 110 may output the audio 400*a* corresponding to the first broadcast channel from the received broadcast signal through the speaker 176 and/or the audio apparatus 300.

The remote control device 200 may include a power button 201*a*, a volume removal button 201*b*, a volume adjustment button 201*c*, a channel change button 201*d*, a pointer button 201*e*, a directional button 201*f* and/or an enter button 201*g*. The remote control device 200 may also include a sound stay button corresponding to the sound stay function. The remote control device 200 may include various buttons other than the above described buttons (e.g., 201*a* to 201*g* or sound stay button).

Further, the electronic apparatus 100 may transmit the first sound 400*a* corresponding to the first broadcast channel to the audio apparatus 300 in a wired or wireless manner under control of the controller 110.

The controller 310 of the audio apparatus 300 may receive the first sound 400*a* corresponding to the first broadcast channel transmitted from the electronic apparatus 100 through one of the communicator 330 and/or the input/output interface 360. The controller 310 of the audio apparatus 300 may output the received first sound 400*a* through the speaker 375. Further, the storage 380 may store the received first sound under control of the controller 110.

According to an embodiment, the term "user" may indicate a person who controls the function or the operation of the electronic apparatus 100 by using the remote control device 200, and includes a user, a manager, or an installer.

At operation S302 of FIG. 3A, a sound stay control command may be received from the remote control device.

Figure 4B:
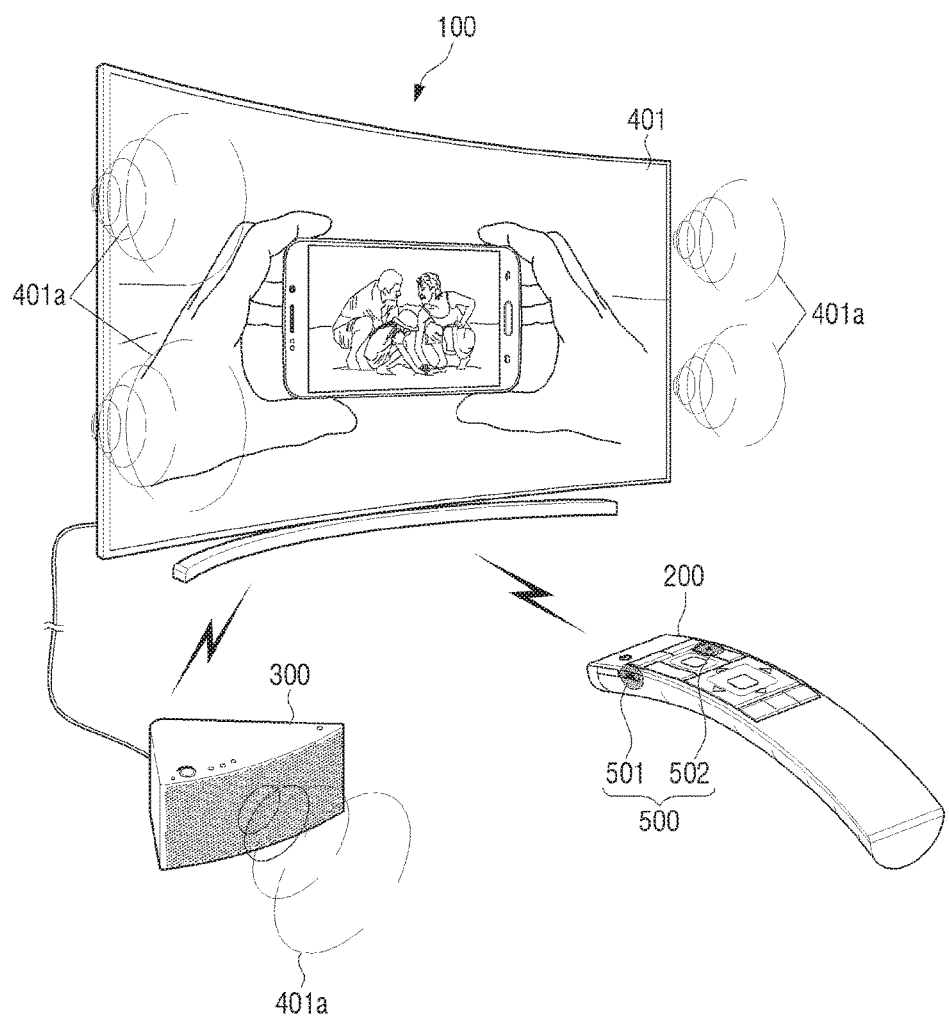

Referring to FIG. 4B, the in-program commercial break 401 may be displayed during the boxing game 400 on the electronic apparatus 100.

When the in-program commercial break 401 is displayed on the electronic apparatus 100, the controller 110 of the electronic apparatus 100 may output the sound 401*a* corresponding to the in-program commercial break 401 through the speaker 176 and/or the audio apparatus 300. The sound corresponding to the images 400 and 401 displayed at the first broadcast channel may be named as first sound 400*a* and 401*a*.

When the in-program commercial break 401 is displayed on the electronic apparatus 100, a user may input a first input 500 on the sound stay buttons 201*b* and 201*d* of the remote control device 200 according to the implementing the sound stay function of the electronic apparatus 100. The first input may include selection 501 of the volume removal button 201*b* and selection 502 of the channel changing button 201*d* regarding the remote control device 200. Further, the first input 500 may include selection 501' of the sound stay button and the selection 502 of the channel changing button 201*d* regarding the remote control device 200.

The first input 500 may include the key (or button) selecting of a user, the key (or button) pressing of a user, the key touching of a user, and the touch gestures of a user. Further, the first input 500 may include the user voice input through the microphone 263 or the user motion (or the movement of the remote control device 200) detected by the sensor 264.

The above described button may be one example of the button corresponding to the sound stay function and may not be limited to herein. Further, the type and the number of the button corresponding to the sound stay function may be modified.

According to an exemplary embodiment, the sound stay function is a function to change the first broadcast channel displayed on the screen of the electronic apparatus 100 to the second broadcast channel and maintain outputting the sound corresponding to the first broadcast channel instead of the sound corresponding to the second broadcast channel. For example, the in-program commercial break 401 of the first broadcast channel (e.g., boxing game 400 at a sports channel) may be displayed on the screen of the electronic apparatus 100.

When the in-program commercial break 401 is displayed on the electronic apparatus 100, a user may switch the first broadcast channel to the second broadcast channel (e.g., weather forecast 450). When switched to the second broadcast channel 450, the controller 110 of the electronic apparatus 100 may output the sound (e.g., first sound 401*a*) corresponding to the first broadcast channel (e.g., in-program commercial break 401) through the speaker 176 of the electronic apparatus 100 instead of the sound corresponding to the second broadcast channel 450.

The controller 210 of the remote control device 200 may transmit the first control signal corresponding to the first input 500 to the electronic apparatus 100. The controller 210 of the remote control device 200 may transmit the first control signal corresponding to the selection 501 of the volume removal button 201b and the selection 502 of the channel changing button 201d to the electronic apparatus 100 through one of the wireless LAN communicator 231, the near field communicator 232 and the optical transmitter 250. Further, the controller 210 of the remote control device 200 may transmit the first control information corresponding to the selection 501' of the sound stay button and the selection 502 of the channel changing button 201d to the electronic apparatus 100 through one of the wireless LAN communicator 231, the near field communicator 232 and the optical transmitter 250.

The first control information may be control information to display the second broadcast channel on the screen of the electronic apparatus 100 and output the sound corresponding to the first broadcast channel through the speaker.

When the first control information is transmitted through the optical transmitter 250, a user may maintain the first input 500 for a preset time period. For example, the preset time may be 300 ms that can be modified through the establishment. The preset time corresponding to the first control information may indicate that the first input 500 is selected by a user for a longer time period than the signal period from the first leader code of the remote controller code format to the consecutive second leader code (e.g., until the consecutive continuous code to the second leader code is output). The preset time period may be modified according to the model or the manufacturer of the remote control device 200.

When the first control information is transmitted through the near field communicator (e.g., Bluetooth), the controller 210 of the remote control device 200 may transmit the first control information in Bluetooth packet to the electronic apparatus 100.

Bluetooth packet may include the access code (72 bit) to determine the effectiveness of the packet, the header (54 bit), and the payload (0~2,745 bit). The access code may be used in determining the effectiveness of the packet. The header may include a media access control (MAC) address and the packet type. The payload may include the transmitted data, and modified in terms of the size according to the type of the transmitted packet. The transmitted first control information may be included in the payload of the packet.

When the remote control device 200 and the electronic apparatus 100 are initially connected to each other, the controller 210 of the remote control device 200 may search the electronic apparatus 100 by using the near field communicator (e.g., Bluetooth). The controller 210 may request the inquiry and connection page to the electronic apparatus 100. Further, when the remote control device 200 and the electronic apparatus 100 are initially connected to each other, the controller 210 of the remote control device 200 may be connected to the electronic apparatus 100 by using the near field communicator (e.g., Bluetooth low energy).

The storage 280 may store the electronic apparatus connection information corresponding to the electronic apparatus 100 connected to the remote control device 200 under control of the controller 210. The stored electronic apparatus connection information may include an electronic apparatus name (SSID), an MAC address, operation information (e.g., busy or standby), or context information.

The controller 210 of the remote control device 200 may transmit the first control information to the electronic apparatus 100 by using the stored electronic apparatus connect information.

Items included in the electronic apparatus connection information may be modified, added, or deleted correspondingly to the function (performance or constitution) of the electronic apparatus.

At operation S303 of FIG. 3A, the second (#2) broadcast channel may be displayed on the screen, and the second sound corresponding to the second broadcast channel may be removed.

Figure 4C:
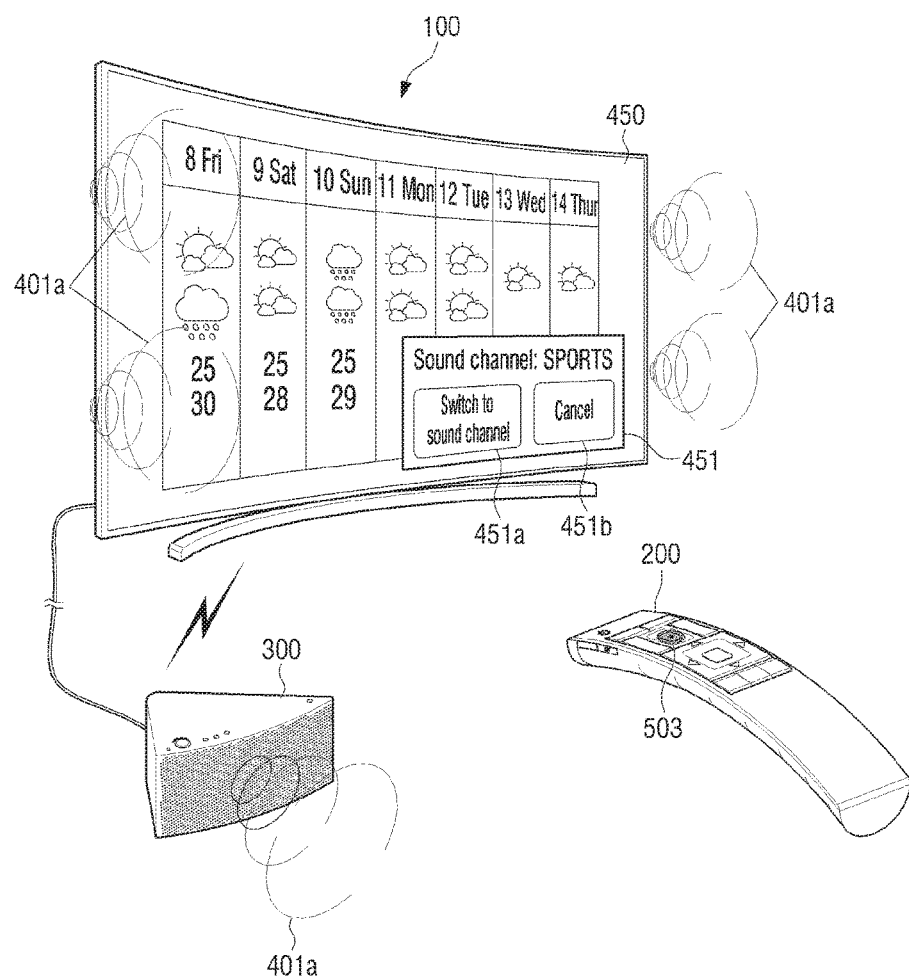

Referring to FIG. 4C, the communicator 130 of the electronic apparatus 100 may receive the first control information from the remote control device 200 under control of the controller 110. The electronic apparatus 100 may receive the first control information output from the remote control device 200 through the communicator 130. Further, the electronic apparatus 100 may receive the first control information output from the remote control device 200 through the optical receiver 150.

The received first control information may be stored in the storage 180 under control of the controller 110.

The controller 110 of the electronic apparatus 100 may display the second broadcast channel 450 on the screen according to the received first control information.

When the first control information is received, the controller 110 may receive the broadcast signal corresponding to the second broadcast channel through the first tuner. The controller 110 may output the video corresponding to the second broadcast channel in the received broadcast signal on the display 170.

The controller 110 may display the second broadcast channel (e.g., weather forecast 450) on the screen in response to the first control information. The controller 110 may not output the second sound corresponding to the second broadcast channel through the speaker 176 in response to the first control information (mute). Further, the controller 110 may not output the second sound corresponding to the second broadcast channel through the audio apparatus 300 in response to the first control information.

At operation S304 of FIG. 3A, the first sound corresponding to the first broadcast channel may be outputted through the speaker of the electronic apparatus 100 and/or the audio apparatus 300.

Referring to FIG. 4C, the controller 110 may output the first sound 401a corresponding to the first broadcast channel (e.g., in-program commercial break) through the speaker 176 by using the second tuner in response to the first control information. Further, the controller 110 may output the first sound 401a corresponding to the first broadcast channel (e.g., in-program commercial break) through the audio apparatus 300 in response to the first control information.

When the first control information is received, the controller 110 may receive the broadcast signal corresponding to the first broadcast channel (e.g., in-program commercial break) through the second tuner. The controller 110 may not output the video corresponding to the first broadcast channel in the received broadcast signal. Further, the controller 110 may store the video corresponding to the received first broadcast channel in the storage 180.

While viewing the second broadcast channel, a user may confirm the state of the first broadcast channel 400 (e.g., checking whether in-program commercial break or boxing game is airing) according to the first sound 400a output through the speaker 176.

The controller 110 may display a pop-up window 451 on the screen in response to the first control information. The pop-up window 451 may be displayed on one side of the screen (e.g., one of the upper, lower, right, and left sides). Further, the pop-up window 451 may be displayed on one of the corners of the screen (e.g., left upper corner, right upper corner, left lower corner and right lower corner).

The size of the pop-up window 451 is smaller than the size of the screen. The size of the pop-up window 451 may be more than 10% and less than 50% of the screen size.

The pop-up window 451 may contains two buttons, "switch to the sound channel" and "cancel", which allow the user to select to switch the sound channel 451a (switch to the previous channel) or "cancel" to allow the user to cancel the pop-up window 451b. The "switch to the sound channel" button 451a may indicate the previous channel number (broadcast channel 400) and the current channel number (second broadcast channel 450) on the screen.

The pop-up window 451 may be displayed for a while when the sound stay function is performed.

The pop-up window 451 may be overlapped with the broadcast channel displayed on the electronic apparatus 100 because of its transparency. The transparency may be established to be 1 to 99%, for example, by a manufacturer or a user.

Figure 4D:
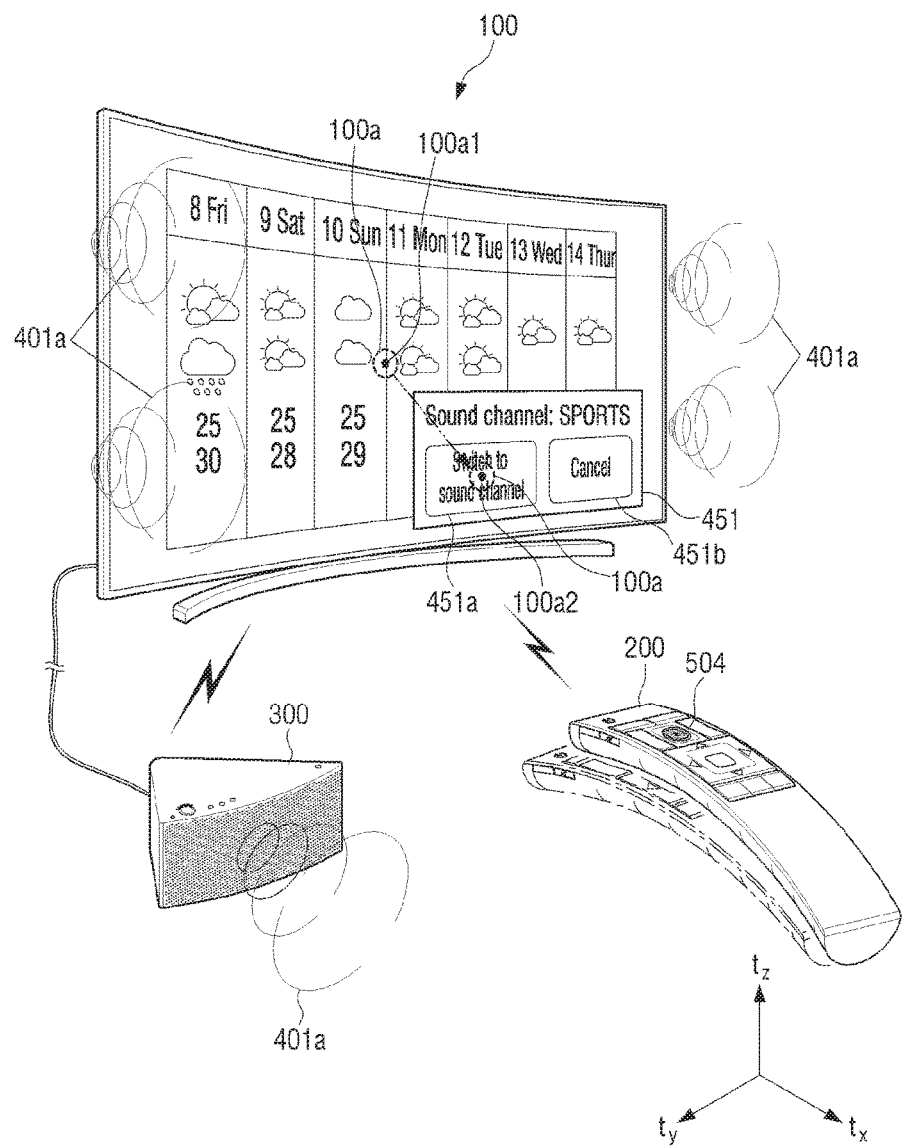

Although FIG. 4D illustrates and explains that the pop-up window 451 is overlapped and displayed on the image of the second broadcast channel 450, it may not be limited to herein. For example, the pop-up window 451 may be displayed on one side of the second broadcast channel 450 so as not to be overlapped with each other. Further, instead of the pop-up window 451, a smaller menu bar may be displayed on the lower border section of the second broadcast channel 450.

At operation S305 of FIG. 3A, the "switch to the first broadcast channel" may be selected.

Referring to FIGS. 4C and 4D, a user may select the "switch to the first broadcast channel".

A user may input the second input 503 on the pointer button 201e of the remote control device 200. The controller 210 of the remote control device 200 may transmit the second control information corresponding to the selection of the pointer button 201e to the electronic apparatus 100.

The controller 210 of the remote control device 200 may transmit the second control information corresponding to the selection of the pointer button 201e to the electronic apparatus 100 through one of the wireless LAN communicator 231, the near field communicator 232 and the optical transmitter 250. The second control information may be control information to display a pointer 100a on the screen of the electronic apparatus 100.

The electronic apparatus 100 may receive the second control information output from the remote control device 200 through the communicator 230. Further, the electronic apparatus 100 may receive the second control information output from the remote control device 200 through the optical receiver 150.

The received second control information may be stored in the storage 180 under control of the controller 110.

The controller 110 of the electronic apparatus 100 may display the pointer 100a on the screen by using the received second control information. The controller 110 may display the pointer 100a on the established position of the screen in the electronic apparatus 100. For example, the established position may be center area of the screen in the electronic apparatus 100 or the previous final pointer position. The storage 180 may store the final pointer position under control of the controller 110.

The size of the pointer 100a may be modified based on the electronic apparatus information corresponding to the electronic apparatus 100. For example, the size of the pointer 100a may be modified according to the screen size or the screen resolution of the electronic apparatus 100.

A user may perform the first movement (e.g., from a first position 100a1 to a second position 100a2) of the remote control device 200 in order to switch to the sound channel of the electronic apparatus 100. A user may move the remote control device 200 toward the two axes or the three axes. For example, a user may move the remote control device 200 toward X and Y axes and/or X, Y and Z axes (e.g., from 100a1 to 100a2). The remote control device 200 may be moved toward the three axes (e.g., X, Y and Z axes) by a user. For example, the remote control device 200 may be moved to the right lower side by a user.

The first movement of the remote control device 200 may be detected by the sensor 264. The first movement of the remote control device 200 may be periodically detected by the sensor 264 (e.g., the time interval when the sensor can detect the first movement of the remote control device 200). The sensor 264 may output the analog signal detected in response to the first movement of the remote control device 200 (e.g., from the first position 100a1 to the second position 100a2) to the controller 210. Further, the analog signal detected from the sensor 264 may be converted to the digital signal with a converter. The digital signal may be output to the controller 210.

The storage 280 may store the detected analog signal or the converted digital signal under control of the controller 210. The following will name the stored analog signal or digital signal to be first movement information. The stored first movement information may include movement information identifier (ID) for the record management, the detected acceleration values of the remote control device 200 (e.g., two axes or three axes), the detected moving time of the remote control device 200, or the moving distance of the remote control device 200.

The first movement information may be periodically stored from the first position 100a1 (e.g., the screen center area) to the second position 100a2 (e.g., the internal area of the switch to the sound channel 451a). The first movement information may be the movement information stored according to the time interval when the movement of the remote control device 200 can be detected by the resolution of the sensor 264.

The controller 210 may generate the third control information by using the stored first movement information. The controller 210 may generate the third control information by using the first movement information which is periodically stored. The third control information may be generated from the first position 100a1 to the second position 100a2. The third control information may be control information to move the pointer 100a two dimensionally on the screen of the electronic apparatus 100.

The third control information may include the two dimensional or the three dimensional third control information. The two dimensional third control information may be third control information generated by excluding one axis from the movement of the remote control device 200.

The three dimensional third control information may be third control information generated in response to the movement of the remote control device 200. The controller 210 may transmit at least one of the two dimensional and the three dimensional third control information to the electronic apparatus 100.

The controller 210 may periodically transmit the third control information generated from the first position 100a1 to the second position 100a2 to the electronic apparatus 100.

The communicator 130 of the electronic apparatus 100 may receive the third control information from the remote control device 200 under control of the controller 110. The electronic apparatus 100 may receive the third control information output from the remote control device 200 through at least one of the communicator 130 and the optical receiver 150. The received third control information may be stored in the storage 180 under control of the controller 110.

The controller 110 may move the pointer 100a displayed on the screen of the electronic apparatus 100 (e.g., from the first position 100a1 to the second position 100a2) by using the received third control information. The controller 110 may move the pointer 100a displayed on the screen two dimensionally by using the received third control information.

The controller 110 may modify the moving speed of the pointer 100a in response to the received third control information. For example, when the remote control device 200 is moved quickly by a user, the controller 110 may move the pointer 100a quickly in response to the received third control information. Further, when the remote control device 200 is moved slowly by a user, the controller 110 may move the pointer 100a slowly in response to the received third control information.

When the pointer 100a is positioned on the second position 100a2 (e.g., the switch to the sound channel), a user may input the third input 504 to select the switch to the sound channel 451a by using the remote control device 200.

The controller 210 of the remote control device 200 may transmit the fourth control information corresponding to the third input 504 to the electronic apparatus 100. The controller 210 of the remote control device 200 may transmit the fourth control information corresponding to the third input 504 (e.g., the selection 504 of the pointer button 201e) to the electronic apparatus 100 through at least one of the wireless LAN communicator 231, the near field communicator 232 and the optical transmitter 250. Further, the controller 210 of the remote control device 200 may transmit the fourth control information corresponding to the third input (e.g., the selection 504 of the enter button 201g) to the electronic apparatus 100 through at least one of the wireless LAN communicator 231, the near field communicator 232 and the optical transmitter 250.

The fourth control information may be control information corresponding to the switch to the sound channel on the screen of the electronic apparatus 100.

Although FIG. 4D illustrates and explains that the menu is selected by using the pointer, it may not be limited to herein. For example, when the pop-up window 451 is displayed, one of the menus 451a and 451b within the pop-up window 451, i.e., the switch to the sound channel 451a or the switch to the previous channel 451b may be initially displayed with the highlight. When a user manipulates the directional button, another menu (e.g., cancel 451c) may be displayed with the highlight according to the directional button. When a user pushes the enter button 201g, the highlighted menu may be selected.

When the switch to the first broadcast screen is not selected at operation S305 of FIG. 3A, operation S307 of FIG. 3A may be performed.

At operation S306 of FIG. 3A, the first broadcast channel may be displayed on the screen of the electronic apparatus and the first sound may be continuously output through the speaker and/or the audio apparatus 300.

Figure 4E:
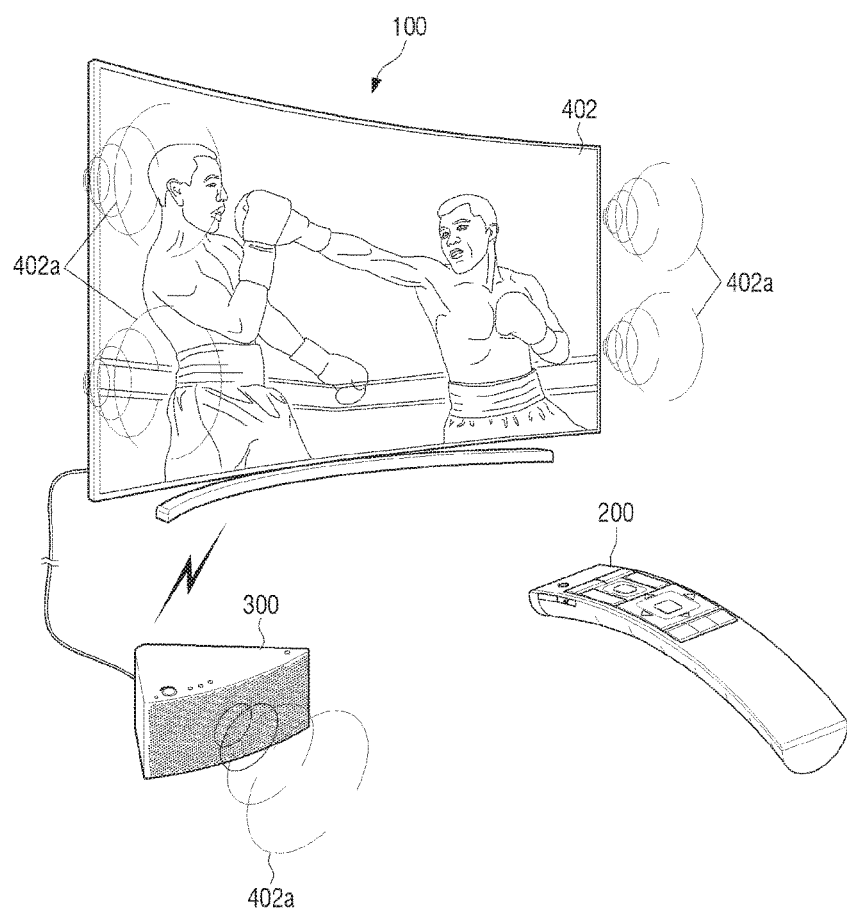

Referring to FIG. 4E, the communicator 130 of the electronic apparatus 100 may receive the fourth control information from the remote control device 200 under control of the controller 110. The electronic apparatus 100 may receive the fourth control information output from the remote control device 200 through the communicator 130.

The received fourth control information may be stored in the storage 180 under control of the controller 110.

The controller 110 of the electronic apparatus 100 may display the first broadcast channel 402 on the screen by using the received fourth control information. The first broadcast channel 402 may be corresponding to the same channel (the first broadcast channel 400) but corresponding to the different image of the first broadcast channel 400. For example, when the first broadcast channel 400 may display the second round of the boxing game, the first broadcast channel 402 may display the third round of the boxing game. The in-program commercial break 401 may be displayed during the rest time between the second round and the third round.

When the fourth control information is received, the controller 110 may receive the broadcast signal corresponding to the first broadcast channel through the first tuner. The controller 110 may output the video 402 corresponding to the first broadcast channel in the received broadcast signal on the display 170.

The controller 110 may continuously output the first sound 402a corresponding to the first broadcast channel through the speaker 176 in response to the fourth control information.

When the fourth control information is received, the controller 110 may receive the broadcast signal corresponding to the first broadcast channel through one of the first tuner and the second tuner. The controller 110 may output the video 402 corresponding to the first broadcast channel in the received broadcast signal on the display 170.

The controller 110 may continuously output the first sound corresponding to the first broadcast channel through the speaker 176 in response to the fourth control information. Further, the controller 110 may continuously output the first sound 402a corresponding to the first broadcast channel to the audio apparatus 300 in response to the fourth control information.

When the fourth control information is received, the controller 110 may close the pop-up window 451 from the screen.

At operation S306 of FIG. 3A, when the first broadcast channel is displayed on the screen of the electronic apparatus and the first sound is output through the speaker, the method for controlling the sound of the electronic apparatus may be completed.

Returning to operation S305 of FIG. 3A, when the first broadcast channel is not selected, operation S307 of FIG. 3A may be performed.

At operation S307 of FIG. 3A, the stay of the second broadcast channel may be selected.

Figure 4F:
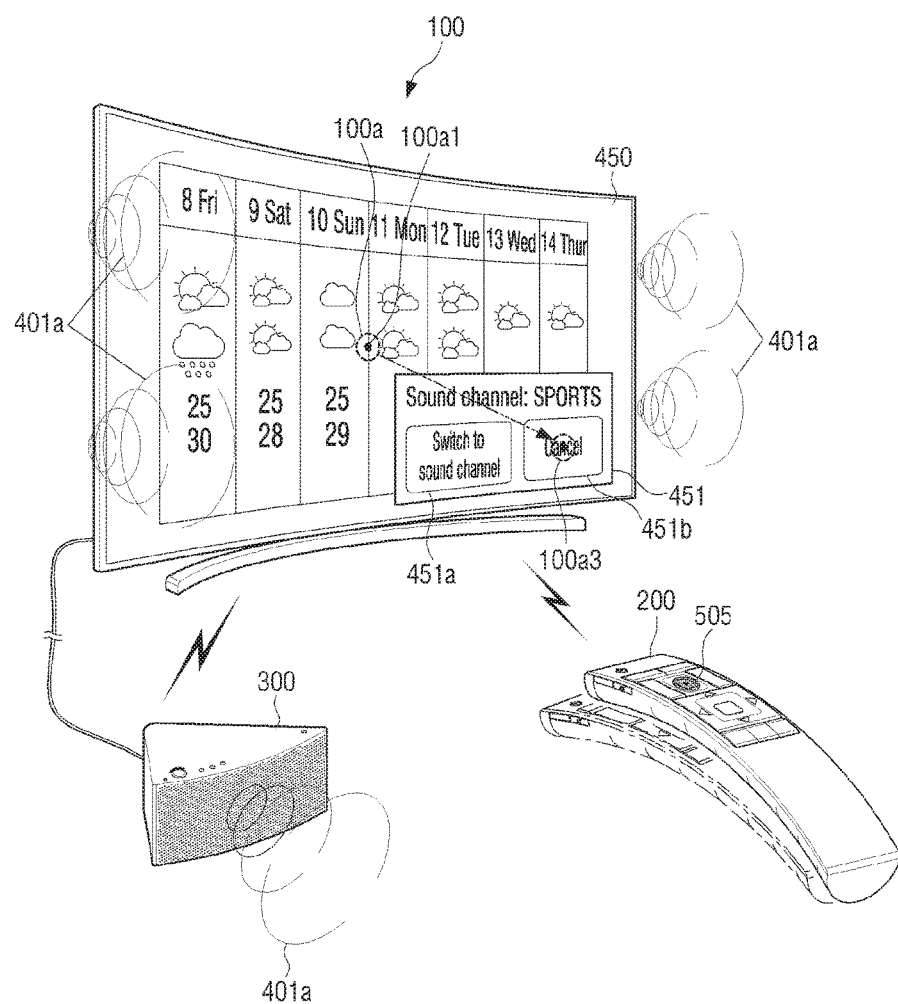

Referring to FIGS. 4C and 4F, the stay of the second broadcast channel may be selected by a user.

A user may input the second input 503' on the pointer button 201e of the remote control device 200. The controller 210 of the remote control device 200 may transmit the second control information corresponding to the selection of the pointer button 201e to the electronic apparatus 100.

The controller 210 of the remote control device 200 may transmit the second control information corresponding to the selection of the pointer button 201*e* to the electronic apparatus 100 through one of the wireless LAN communicator 231, the near field communicator 232 and the optical transmitter 250. The second control information may be control information to display the pointer 100*a* on the screen of the electronic apparatus 100.

The electronic apparatus 100 may receive the second control information output from the remote control device 200 through the communicator 230. Further, the electronic apparatus 100 may receive the second control information output from the remote control device 200 through the optical receiver 150.

The received second control information may be stored in the storage 180 under control of the controller 110.

The controller 110 of the electronic apparatus 100 may display the pointer 100*a* on the screen by using the received second control information. The controller 110 may display the pointer 100*a* on the established position of the screen in the electronic apparatus 100. For example, the established position may be screen center area of the electronic apparatus 100 or previous final pointer position. The storage 180 may store the final pointer position under control of the controller 110.

The size of the pointer 100*a* may be modified in response to the electronic apparatus information corresponding to the electronic apparatus 100. For example, the size of the pointer 100*a* may be modified in response to the screen size or the screen resolution of the electronic apparatus 100.

A user may perform the second movement (e.g., from the first position 100*a*1 to a third position 100*a*3) of the remote control device 200 in order to select the cancel button 451*b*. A user may move the remote control device 200 toward the two axes or the three axes. For example, a user may move the remote control device 200 toward X and Y axes and/or X, Y, and Z axes (e.g., from 100*a*1 to 100*a*3). The remote control device 200 may be moved toward the three axes (e.g., X, Y, and Z axes) countered to the electronic apparatus 100 by a user. For example, the remote control device 200 may be moved toward the right lower side by a user.

The second movement of the remote control device 200 may be detected by the sensor 264. The second movement of the remote control device 200 may be periodically detected by the sensor 264 (e.g., time interval when the sensor can detect the second movement of the remote control device 200). The sensor 264 may output the analog signal detected in response to the second movement of the remote control device 200 (e.g., from the first position 100*a*1 to the third position 100*a*3) to the controller 210. Further, the analog signal output from the sensor 264 may be converted to the digital signal by the converter. The converted digital signal may be output to the controller 210.

The storage 280 may store the detected analog signal or the converted digital signal under control of the controller 210. The following will name the stored analog signal or digital signal to be second movement information. The stored second movement information may include the movement information identifier (ID) for the record management, the detected acceleration values of the remote control device 200 (e.g., two axes or three axes), the detected moving time of the remote control device 200 or the moving distance of the remote control device 200.

The second movement information may be periodically stored from the first position 100*a*1 (e.g., screen center area) of the remote control device 200 to the third position 100*a*3 (e.g., the internal area within the cancel or the stay of the second broadcast channel 451*b*). The second movement information may be the movement information stored in response to the time interval when the movement of the remote control device 200 can be detected with the resolution of the sensor 264.

The controller 210 may generate the fifth control information by using the stored second movement information. The controller 210 may generate the fifth control information by using the second movement information periodically stored. The fifth control information may be generated from the first position 100*a*1 to the third position 100*a*3. The fifth control information may be control information to move the pointer 100*a* toward the two dimensional area on the screen of the electronic apparatus 100.

The fifth control information may include the two dimensional or the three dimensional fifth control information. The two dimensional fifth control information may be fifth control information generated by excluding one axis from the movement of the remote control device 200.

The three dimensional fifth control information may be fifth control information generated in response to the movement of the remote control device 200. The controller 210 may transmit at least one of the two dimensional and the three dimensional fifth control information to the electronic apparatus 100.

The controller 210 may periodically transmit the fifth control information generated from the first position 100*a*1 to the third position 100*a*3 of the remote control device 200 to the electronic apparatus 100.

The communicator 130 of the electronic apparatus 100 may receive the fifth control information from the remote control device 200 under control of the controller 110. The electronic apparatus 100 may receive the fifth control information output from the remote control device 200 through the communicator 130. The received fifth control information may be stored in the storage 180 under control of the controller 110.

The controller 110 may move the pointer 100*a* displayed on the screen of the electronic apparatus 100 (e.g., from the first position 100*a*1 to the third position 100*a*3) by using the received fifth control information. The controller 110 may move the pointer 100*a* displayed on the screen two dimensionally by using the received fifth control information.

The controller 100 may modify the moving speed of the pointer 100*a* in response to the received fifth control information. For example, when the remote control device 200 is quickly moved by a user, the controller 110 may quickly move the pointer 100*a* in response to the received fifth control information. Further, when the remote control device 200 is slowly moved by a user, the controller 110 may slowly move the pointer 100*a* in response to the received fifth control information.

When the pointer 100*a* is positioned on the third position 100*a*3 (e.g., cancel), a user may perform the fourth input 505 to select the cancel 451*b* by using the remote control device 200.

The controller 210 of the remote control device 200 may transmit a sixth control signal corresponding to the fourth input 505 to the electronic apparatus 100. The controller 210 of the remote control device 200 may transmit the sixth control information corresponding to the fourth input (e.g., selecting 504 of the pointer button 201*e*) to the electronic apparatus 100 through at least one of the wireless LAN communicator 231, the near field communicator 232 and the optical transmitter 250. Further, the controller 210 of the remote control device 200 may transmit the sixth control information corresponding to the fourth input (e.g., selecting 504 of the enter button 201g) to the electronic apparatus 100 through at least one of the wireless LAN communicator 231, the near field communicator 232 and the optical transmitter 250.

The sixth control information may be control information corresponding to the selection of the cancel (or stay of the second broadcast channel) on the screen of the electronic apparatus 100.

At operation S308 of FIG. 3A, the second broadcast channel may be displayed on the screen of the electronic apparatus and the second sound may be output through the speaker and/or the audio apparatus 300.

Figure 4G:
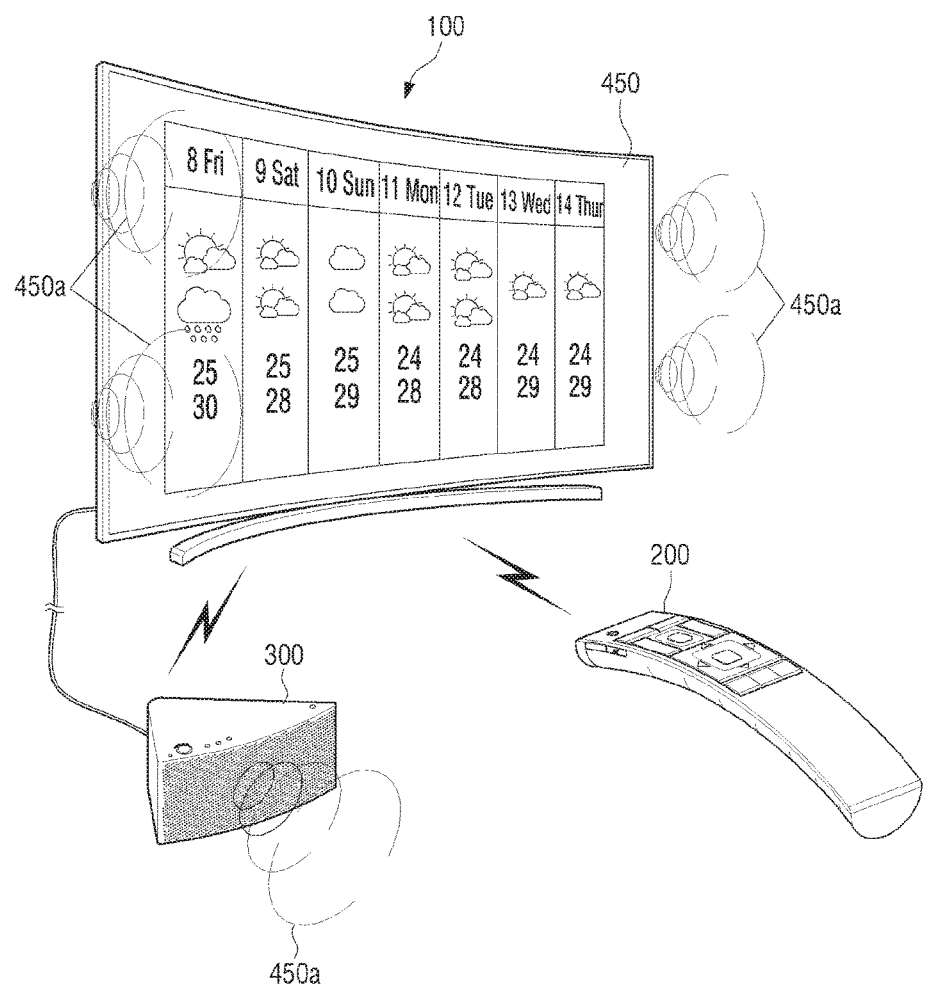

Referring to FIG. 4G, the communicator 130 of the electronic apparatus 100 may receive the sixth control information from the remote control device 200 under control of the controller 110. The electronic apparatus 100 may receive the sixth control information output from the remote control device 200 through the communicator 130. The received sixth control information may be stored in the storage 180 under control of the controller 110.

The controller 110 of the electronic apparatus 100 may continuously display the second broadcast channel 450 on the screen by using the received sixth control information.

When the sixth control information is received, the controller 110 may receive the broadcast signal corresponding to the second broadcast channel through the second tuner. The controller 110 may continuously output the video corresponding to the second broadcast channel in the received broadcast signal on the display 170.

The controller 110 may output the second sound 450a corresponding to the second broadcast channel 450 through the speaker 176 in response to the sixth control information.

When the sixth control information is received, the controller 110 may receive the broadcast signal corresponding to the second broadcast channel through one of the first tuner and the second tuner. The controller 110 may output the video 450 corresponding to the second broadcast channel in the received broadcast signal on the display 170.

The controller 110 may output the second sound 450a corresponding to the second broadcast channel through the speaker 176 in response to the sixth control information. Further, the controller 110 may output the second sound corresponding to the second broadcast channel to the audio apparatus 300 in response to the sixth control information.

When the sixth control information is received, the controller 110 may close the pop-up window 451 from the screen.

At operation S308 of FIG. 3A, when the second broadcast channel is displayed on the screen of the electronic apparatus and the second sound is output through the speaker, the method for controlling the sound of the electronic apparatus may be completed.

Figure 3B:
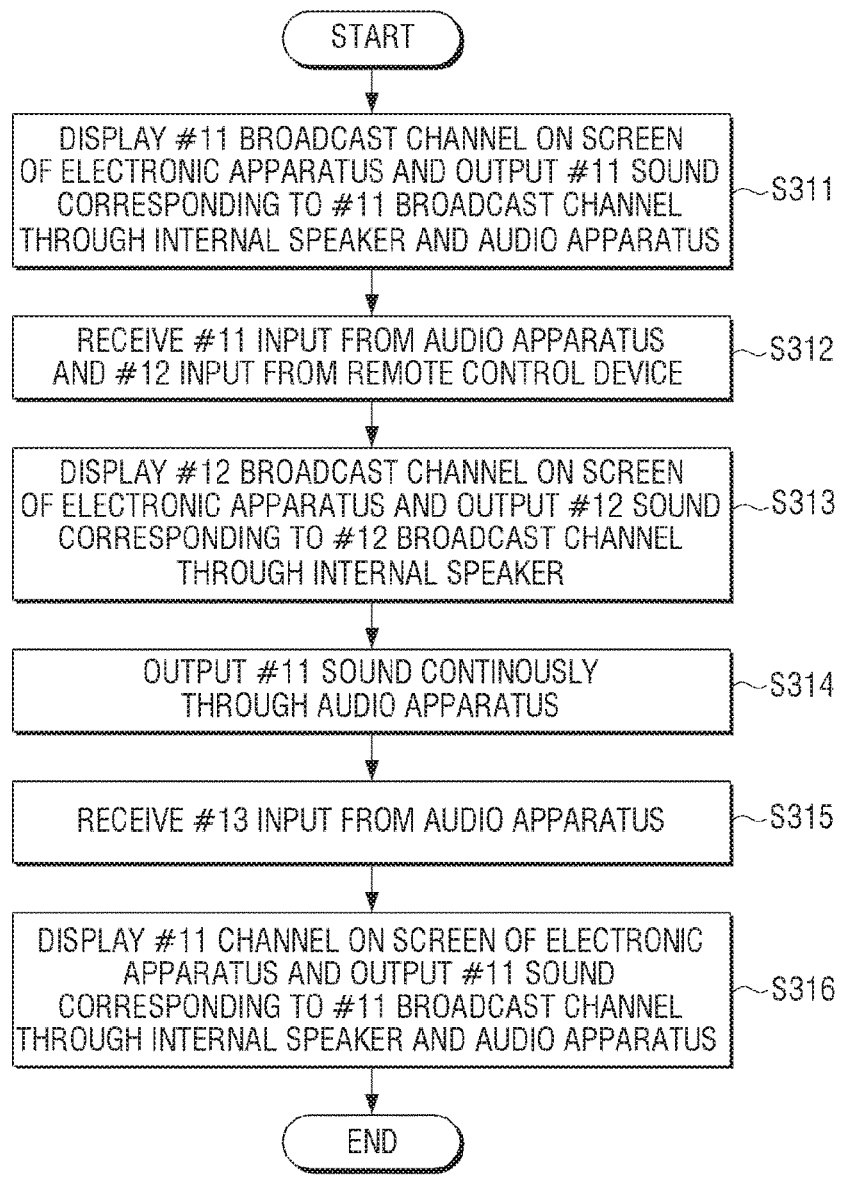
FIG. 3B is a flowchart schematically illustrating a method for controlling the sound of an electronic apparatus according to an exemplary embodiment.

FIG. 3B is a flowchart explaining the method for controlling the sound of the electronic apparatus according to an exemplary embodiment.

FIGS. 5A to 5D are diagrams schematically illustrating examples of the method for controlling the sound of the electronic apparatus according to an exemplary embodiment.

At operation S311 of FIG. 3B, the #11 broadcast channel may be displayed on the screen of the electronic apparatus, and the #11 sound corresponding to the #11 broadcast channel may be output through the internal speaker 176 and the audio apparatus 300.

Figure 5A:
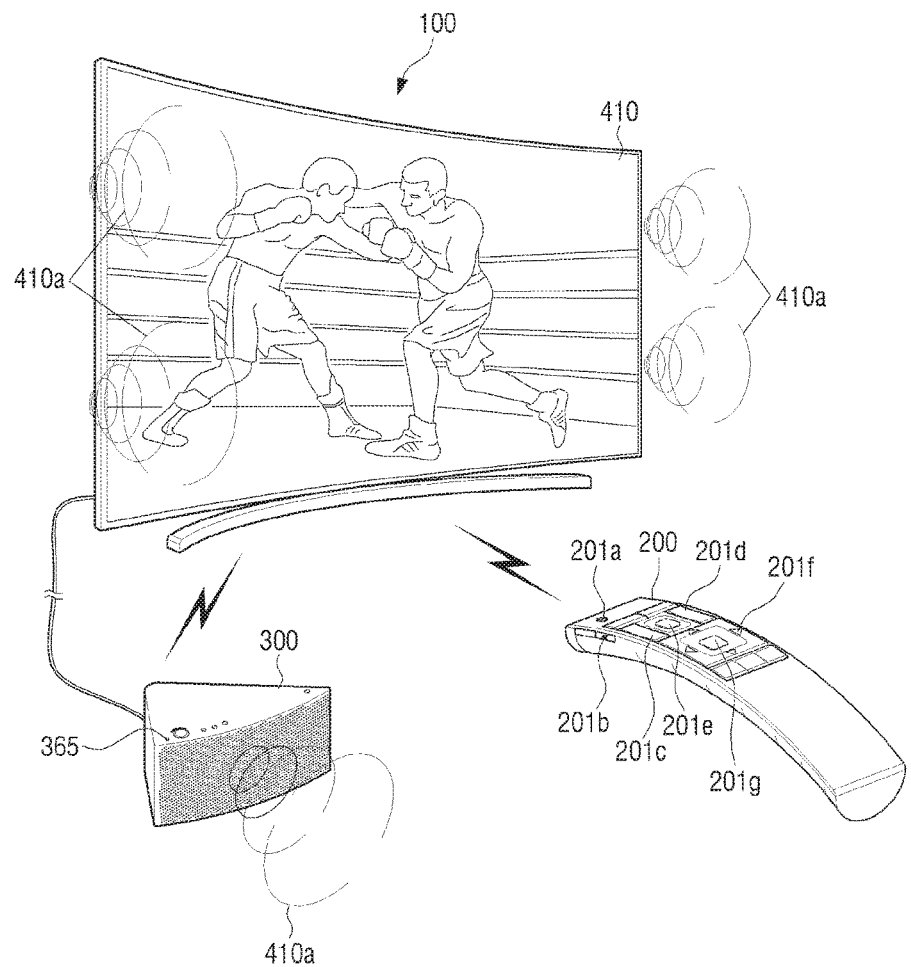
FIGS. 5A to 5D are diagrams schematically illustrating examples regarding a method for controlling the sound of an electronic apparatus according to an exemplary embodiment.

Referring to FIG. 5A, the electronic apparatus 100 may display the #11 broadcast channel 410 (e.g., boxing game) on the display 170 under control of the controller 110, and output the #11 sound 410a corresponding to the #11 broadcast channel through the internal speaker 176 and the audio apparatus 300. The #11 broadcast channel 410 displayed on the screen may be selected by the user input inputted through one of the remote control device 200 and the electronic apparatus 100. The audio apparatus 300 may be an external speaker.

In response to the selection the #11 broadcast channel of a user, the controller 110 may receive the broadcast signal corresponding to the #11 broadcast channel through the first tuner. The controller 110 may output the video corresponding to the #11 broadcast channel in the received broadcast signal on the display 170. The controller 110 may output the audio corresponding to the #11 broadcast channel in the received broadcast signal through the internal speaker 176.

The remote control device 200 may include the power button 201a, the volume removal button 201b, the volume adjustment button 201c, the channel change button 201d, the pointer button 201e, the directional button 201f and/or the enter button 201g. The remote control device 200 may include other various buttons than the above described buttons (e.g., 201a to 201g or sound stay button).

Further, the electronic apparatus 100 may transmit the #11 sound 410a corresponding to the #11 broadcast channel to the audio apparatus 300 in a wired or wireless manner under control of the controller 110.

The controller 310 of the audio apparatus 300 may receive the #11 sound 410a corresponding to the #11 broadcast channel transmitted from the electronic apparatus 100 through one of the communicator 330 and/or the input/output interface 360. The controller 310 of the audio apparatus 300 may output the received #11 sound 410a through the speaker 375. Further, the storage 380 may store the received #11 sound under control of the controller 310.

At operation S312 of FIG. 3B, the #11 input may be received from the audio apparatus (external speaker) 300 and the #12 input may be received from the remote control device 200.

Figure 5B:
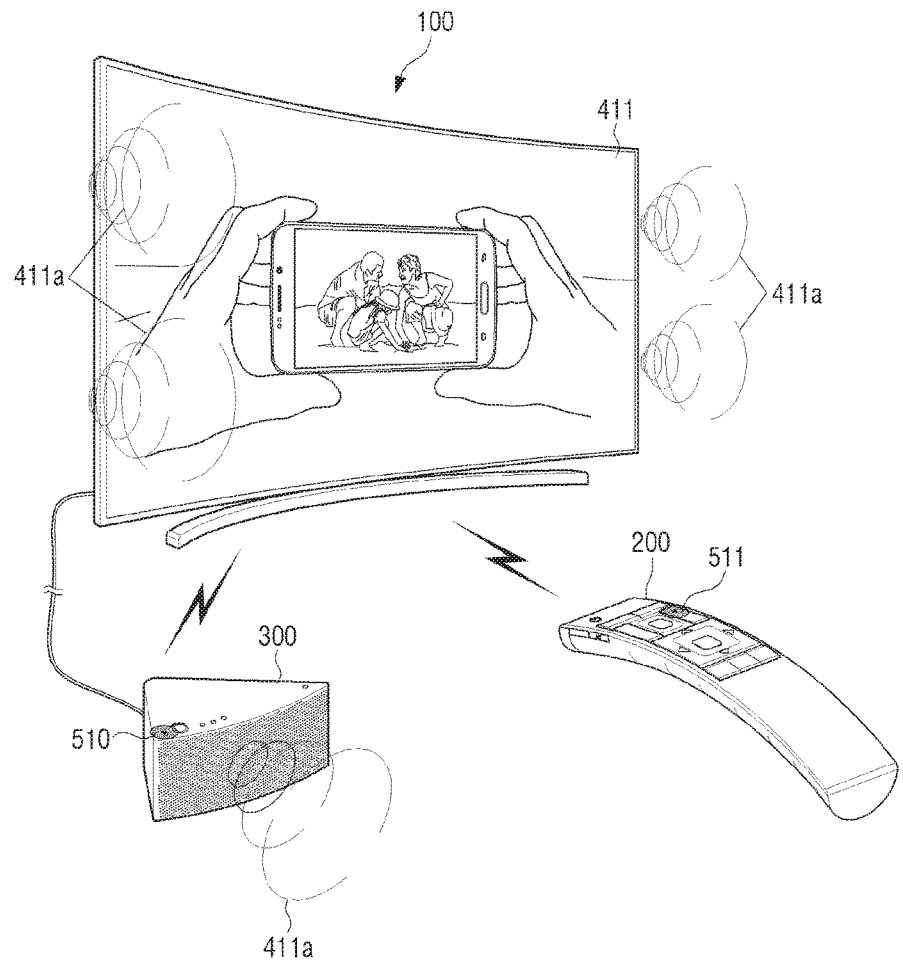

Referring to FIG. 5B, the in-program commercial break 411 may be displayed on the electronic apparatus 100 during the boxing game 410. When the in-program commercial break is displayed, the sound 411a corresponding to the in-program commercial break 411 may be output.

When the in-program commercial break 411 is displayed on the electronic apparatus 100, a user may perform the #11 input 510 on the audio apparatus 300 and the #12 input 511 on the channel change button 201d of the remote control device 200 according to the implementing of the sound stay function in the electronic apparatus 100. The #11 input 510 may be detected by the sensor 365 of the audio apparatus 300. For example, the #11 input 510 may be detected by the near field sensor or the illumination sensor which is one of the sensor 365. Further, the #11 input 510 may be detected by the separate button (e.g., volume removal button) on the front of the audio apparatus 300.

The #12 input 511 may include the selection of the channel change button 201d of the remote control device 200. Further, the #12 input 511 may include the selection of the number button corresponding to the broadcast channel number on the remote control device 200.

According to an exemplary embodiment, the sound stay function is used to change the #11 broadcast channel displayed on the screen of the electronic apparatus 100 to the #12 broadcast channel and maintains output of the sound corresponding to the #11 broadcast channel instead of the sound corresponding to the #12 broadcast channel. For example, the #11 broadcast channel 410 (e.g., boxing game at a sports channel) may display the in-program commercial break 411 on the screen of the electronic apparatus 100.

When the in-program commercial break 411 is displayed on the electronic apparatus 100, a user may change the #11 broadcast channel to the #12 broadcast channel 460 (e.g., weather forecast). When changed to the #12 broadcast channel 460, the controller 110 of the electronic apparatus 100 may output the sound corresponding to the #12 broadcast channel 460 through the speaker 176 of the electronic apparatus 100.

The controller 310 of the audio apparatus 300 may transmit the #11 control signal corresponding to the #11 input 510 to the electronic apparatus 100. The controller 210 of the remote control device 200 may transmit the #12 control information corresponding to the selection of the channel change button 201*d* through one of the communicator 230 and the optical transmitter 250.

The receiving of the #11 and the #12 control information may be control information to display the #12 broadcast channel on the screen of the electronic apparatus 100, output the #11 sound corresponding to the #11 broadcast channel through the internal speaker 176, and output the sound corresponding to the #11 broadcast channel through the audio apparatus 300.

When the #11 control information is transmitted through the near field communicator (e.g., Bluetooth), the controller 210 of the remote control device 200 may transmit the #11 control information in a Bluetooth packet to the electronic apparatus 100.

A Bluetooth packet may include the access code (72 bit) to determine the effectiveness of the packet, the header (54 bit) and the payload (0~2,745 bit). The access code may be used in determining the effectiveness of the packet. The header may include an MAC address and the packet type. The payload may include the transmitted data, and may be modified in terms of the size according to the type of the transmitted packet. The transmitted first control information may be included in the payload of the packet.

When the audio apparatus 300 and the electronic apparatus 100 are initially connected to each other, the controller 310 of the audio apparatus 300 may search the electronic apparatus 100 by using the near field communicator (e.g., Bluetooth). The controller 310 may request the inquiry and the connection page to the electronic apparatus 100. Further, when the audio apparatus 300 and the electronic apparatus 100 are initially connected to each other, the controller 210 of the remote control device 200 may be connected to the electronic apparatus 100 by using the advertising packet received through the near field communicator (e.g., Bluetooth low energy).

The storage 380 may store the electronic apparatus connect information corresponding to the electronic apparatus 100 connected to the audio apparatus 300 under control of the controller 310. The stored electronic apparatus connect information may include an SSID, an MAC address, the operation information (e.g., busy or standby), or the context information.

The controller 310 of the audio apparatus 300 may transmit the #11 control information to the electronic apparatus 100 by using the stored electronic apparatus connect information through one of the communicator 330 and the input/output interface 360.

The controller 210 of the remote control device 200 may transmit the #12 control information to the electronic apparatus 100 through at least one of the wireless LAN communicator 231, the near field communicator 232 and the optical transmitter 250.

Operation S312 of FIG. 3B, in which the controller 210 of the remote control device 200 transmits the #12 control information to the electronic apparatus 100 through at least one of the wireless LAN communicator 231, the near field communicator 232 and the optical transmitter 250, is substantially similar to operation S302 of FIG. 3A in which the first control information is transmitted through at least one of the wireless LAN communicator 231, the near field communicator 232 and the optical transmitter 250 of the remote control device 200.

At operation S313 of FIG. 3B, the #12 broadcast channel may be displayed on the screen and the #12 sound corresponding to the #12 broadcast channel may be output.

Figure 5C:
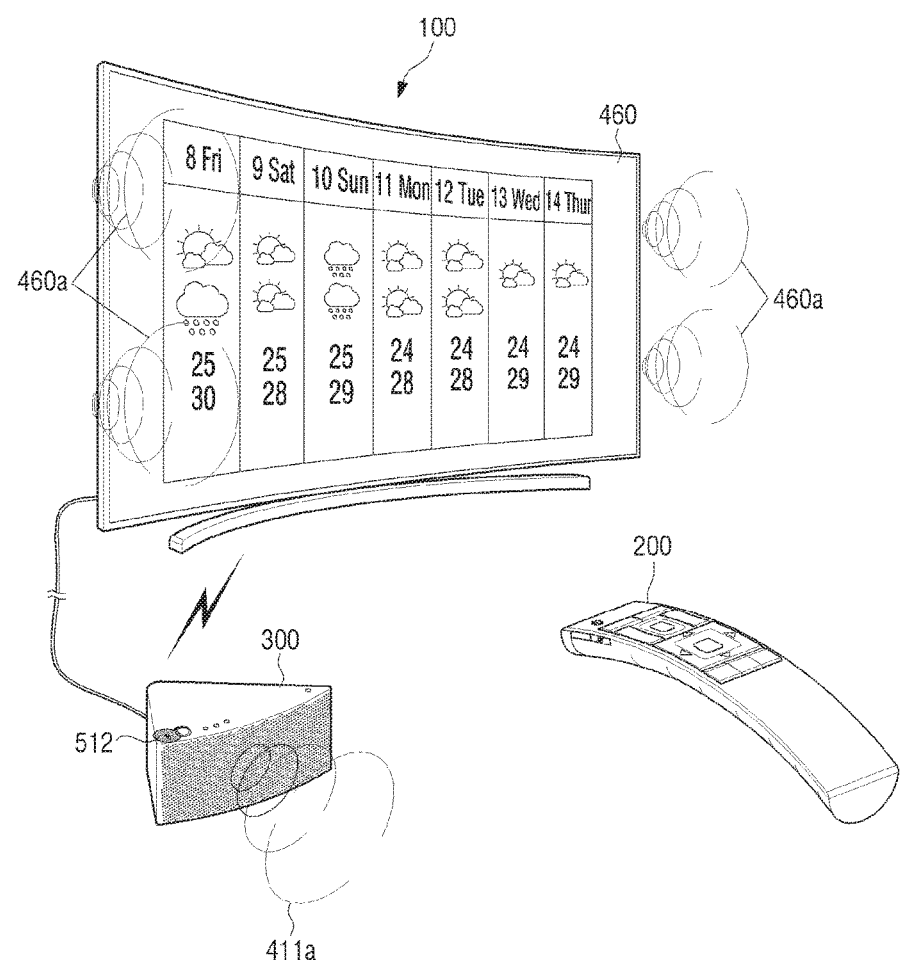

Referring to FIG. 5C, the communicator 130 of the electronic apparatus 100 may receive the #11 control information from the audio apparatus 300 under control of the controller 110. The electronic apparatus 100 may receive the #12 control information from the remote control device 200 through the communicator 130. The received #11 control information and/or the received #12 control information may be stored in the storage 180 under control of the controller 110.

The controller 110 of the electronic apparatus 100 may display the #12 broadcast channel 460 on the screen by using the received #11 and #12 control information.

When the #11 and the #12 control information are received, the controller 110 may receive the broadcast signal corresponding to the #12 broadcast channel through the first tuner. The controller 110 may output the video corresponding to the #12 broadcast channel in the received broadcast signal on the display 170.

The controller 110 may display the #12 broadcast channel 460 (e.g., weather forecast) on the screen in response to the #11 and the #12 control information. Further, the controller 110 may output the #12 sound 460*a* corresponding to the #12 broadcast channel through the internal speaker 176 in response to the #11 and the #12 control information.

At operation S314 of FIG. 3B, the #11 sound corresponding to the #11 broadcast channel may be continuously output in the audio apparatus 300.

Referring to FIG. 5C, when the #11 and the #12 control information are received, the controller 110 may receive the broadcast signal corresponding to the #11 broadcast channel 411 (e.g., in-program commercial break) through the second tuner. The controller 110 may output the #11 sound 411*a* corresponding to the #11 broadcast channel to the audio apparatus 300 in response to the #11 and the #12 control information.

The controller 110 may not output the video corresponding to the #11 broadcast channel in the received broadcast signal. Further, the controller 110 may store the video corresponding to the received #11 broadcast channel in the storage 180. The controller 110 may store the video, the audio and the additional data corresponding to the received #11 broadcast channel in the storage 180.

At operation S315 of FIG. 3B, the #13 input may be received from the audio apparatus.

Referring to FIG. 5C, a user may perform the #13 input 512 on the audio apparatus 300.

The #13 input 512 may be detected by the sensor 365 of the audio apparatus 300. For example, the #13 input 512 may be detected by the near field sensor or the illumination sensor which is one of the sensor 365. Further, the #13 input 512 may be detected by the button (e.g., volume removal button) on the front of the audio apparatus 300.

The #13 input 512 on the audio apparatus 300 may be toggle switch function of the #11 input 510. For example, when the #11 input 510 is to implement the sound stay function, the #13 input may switch the sound stay function off.

The controller 310 of the audio apparatus 300 may transmit the #13 control signal corresponding to the #13 input 512 to the electronic apparatus 100.

The receiving of the #13 control information by the electronic apparatus 100 may be control information corresponding to the switch-off of the sound stay function. For example, it may be control information to display the #11 broadcast channel 412 on the screen of the electronic apparatus 100, output the #11 sound 411a corresponding to the #11 broadcast channel through the internal speaker 176 and output the #11 sound 411a corresponding to the #11 broadcast channel through the audio apparatus 300.

The controller 310 of the audio apparatus 300 may transmit the #13 control information to the electronic apparatus 100 by using the stored electronic apparatus connect information.

Operation S315 of FIG. 3B in which the audio apparatus 300 transmits the #13 control information to the electronic apparatus 100 is substantially similar to operation S312 of FIG. 3B in which the audio apparatus 300 transmits the #11 control information to the electronic apparatus 100.

At operation S316 of FIG. 3B, the #11 broadcast channel may be displayed on the screen of the electronic apparatus, and the #11 sound corresponding to the #11 broadcast channel may be output through the internal speaker and the audio apparatus.

Figure 5D:
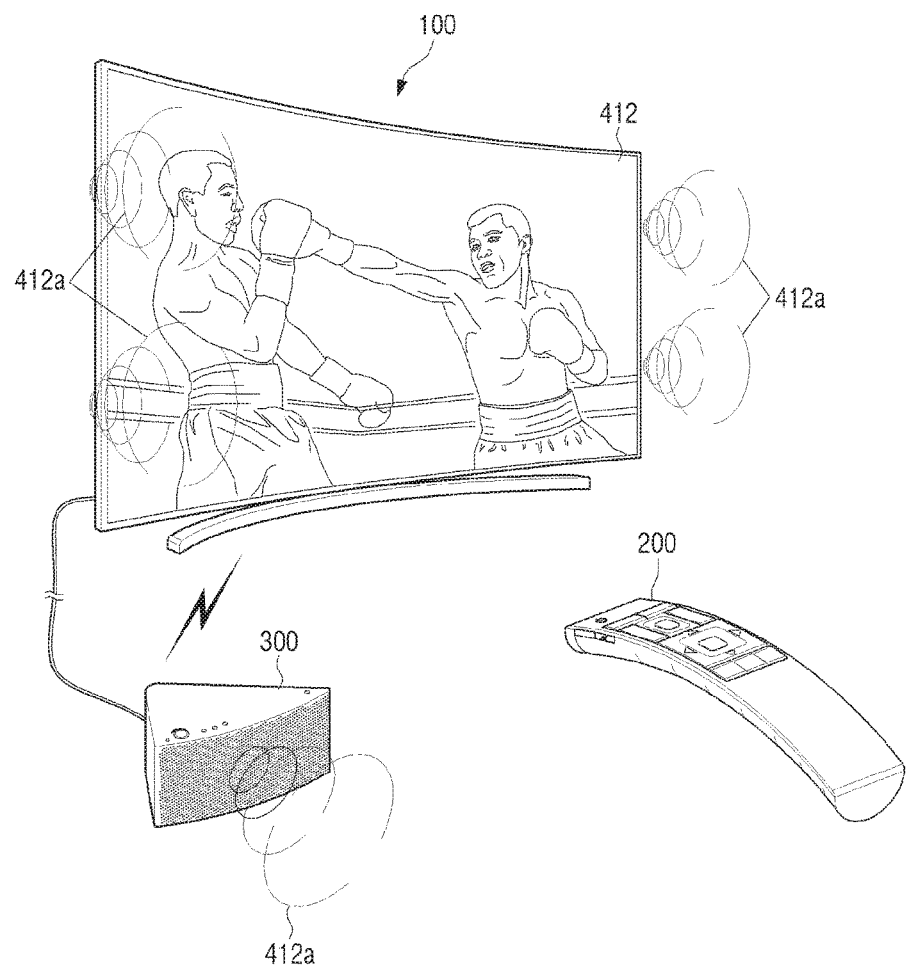

Referring to FIG. 5D, the communicator 130 of the electronic apparatus 100 may receive the #13 control information from the audio apparatus 300 under control of the controller 110. The received #13 control information may be stored in the storage 180 under control of the controller 110.

The electronic apparatus 100 may display the #11 broadcast channel 412 (e.g., boxing game) on the display 170 and output the #11 sound 412a corresponding to the #11 broadcast channel through the internal speaker 176 and the audio apparatus 300 under control of the controller 110. The #11 broadcast channel 412 displayed on the screen may be selected by the user input inputted through one of the remote control device 200 and the electronic apparatus 100. When the #13 control signal is received, the controller 110 may receive the broadcast signal corresponding to the #11 broadcast channel through the first tuner. The controller 110 may output the video corresponding to the #11 broadcast channel in the received broadcast signal on the display 170. The controller 110 may output the audio corresponding to the #11 broadcast channel in the received broadcast signal through the internal speaker 176. Further, the controller 110 of the electronic apparatus 100 may transmit the #11 sound 412a corresponding to the #11 broadcast channel to the audio apparatus 300 in a wired or wireless manner. The controller 310 of the audio apparatus 300 may continuously output the #11 sound 412a.

When the first tuner receives the video, the audio, and/or the additional data corresponding to the #11 broadcast channel, the controller 110 may stop the operation of the second tuner.

At operation S316 of FIG. 3B, when the #11 broadcast channel is displayed on the screen of the electronic apparatus and the #11 sound is output through the internal speaker 176 and the audio apparatus 300, the method for controlling the sound of the electronic apparatus may be completed.

Figure 3C:
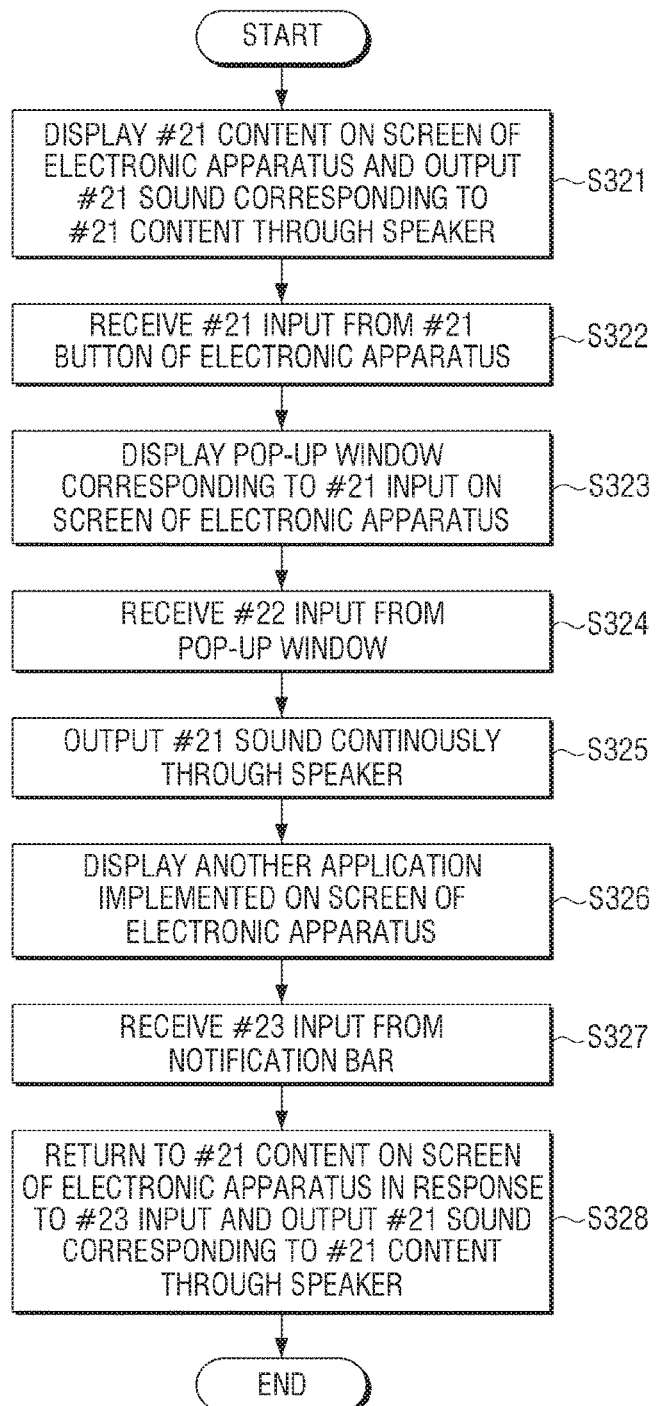
FIG. 3C is a flowchart schematically illustrating a method for controlling the sound of an electronic apparatus according to an exemplary embodiment.

FIG. 3C is a flowchart briefly explaining the method for controlling the sound of the electronic apparatus according to an exemplary embodiment.

FIGS. 6A to 6H are diagrams schematically illustrating examples regarding the method for controlling the sound of the electronic apparatus according to this embodiment. FIGS. 6A to 6H explain a case in which the electronic apparatus is configured as portable phone.

At operation S321 of FIG. 3C, the #21 content may be displayed on the screen of the electronic apparatus, and the #21 sound corresponding to the #21 content may be output through the speaker.

Figure 6A:
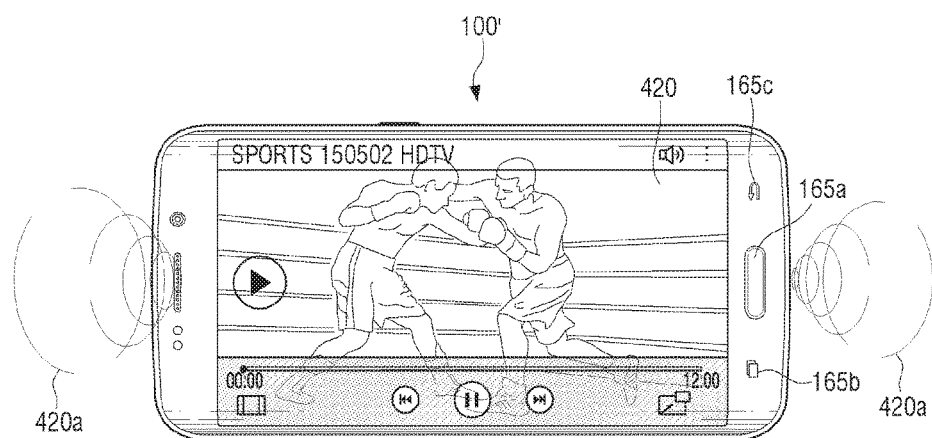
FIGS. 6A to 6H are diagrams schematically illustrating examples regarding a method for controlling the sound of an electronic apparatus according to an exemplary r embodiment.

Referring to FIG. 6A, the electronic apparatus 100' may display the #21 content 420 on the screen (or the display 170) under control of the controller 110, and output the #21 sound 420a corresponding to the #21 content through the speaker 176. A user may select the #21 content 420 displayed by the video player which is one of applications. The #21 content 420 may be boxing game.

In response to the selection of the #21 content 420, the controller 110 may display the #21 content 420 on the screen and output the #21 sound 420a through the speaker 176.

The electronic apparatus 100' may include the home button 165a, the recent implementing app button 165b, and/or the return button 165c.

At operation S322 of FIG. 3C, the #21 input 520 may be received from the #21 button of the electronic apparatus.

Figure 6B:
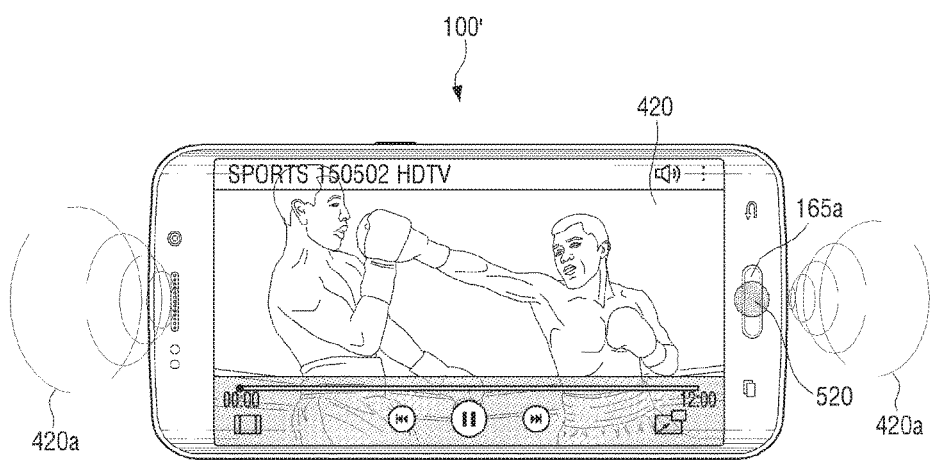

Referring to FIG. 6B, the #21 input may be received from the #21 button 165a of the electronic apparatus 100'.

A user may perform the #21 input 520 on the #21 button 165a of the electronic apparatus 100'. The #21 input 520 may be a long touch. The long touch may indicate the keeping the touch for a preset time (e.g., more than three seconds, modifiable) regarding the #21 button 165a. Further, the #21 button may include one of the recent implementing app button 165b and the return button 165c in addition to the home button.

The controller 110 may store the #21 input information corresponding to the detected #21 input 520 in the storage 180. The stored #21 input information may include the touch identifier (ID) for the record management, the button name (or the button code), the touch keep time, the touch position, or the touch detect time.

At operation S323 of FIG. 3C, the pop-up window may be displayed on the screen of the electronic apparatus.

Figure 6C:
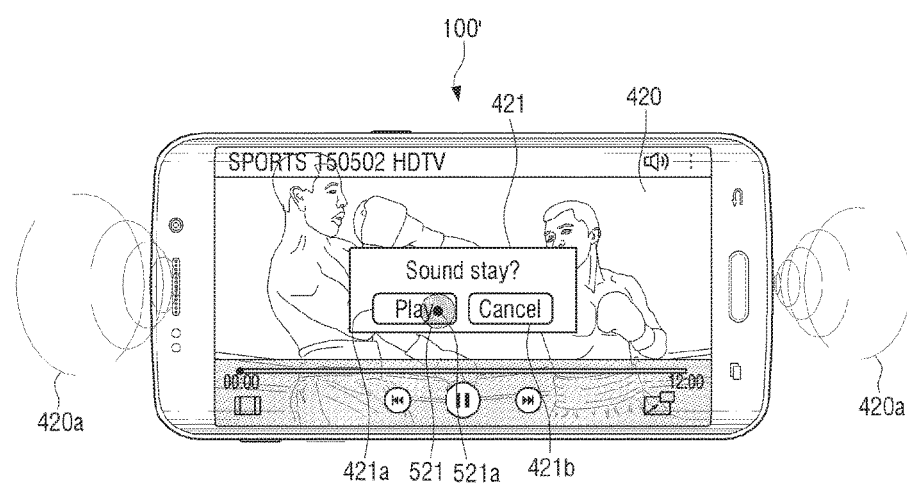

Referring to FIG. 6C, the controller 110 may display the pop-up window 421 according to the #21 input on the screen of the electronic apparatus 100'. The pop-up window 421 may correspond to the sound stay operation of the electronic apparatus 100'.

The pop-up window 421 may be displayed on one side of the screen (e.g., one of the upper, lower, right, and left sides). Further, the pop-up window 421 may be displayed one of the corners (e.g., left upper corner area, right upper corner area, left lower corner area, and right lower corner area).

The size of the pop-up window 421 may be smaller than the size of the screen. The size of the pop-up window 421 may be more than 5% and less than 50% of the screen size.

The pop-up window 421 may include the implementing 421a of the sound stay and/or the cancel 421b of the sound stay, which can be selected by a user.

The pop-up window 421 is transparent and thus may be overlapped with the #21 content 420 displayed on the electronic apparatus 100'. The transparency may be established to be 1% to 99%, for example, by a manufacturer or a user.

Figure 6D:
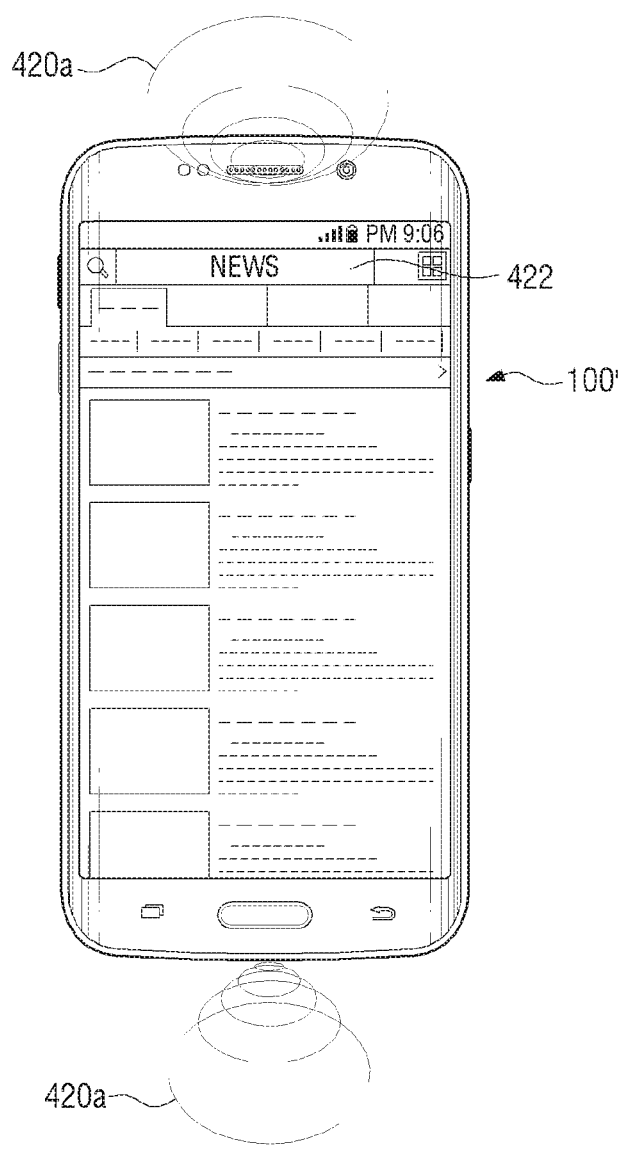
Figure 6E:
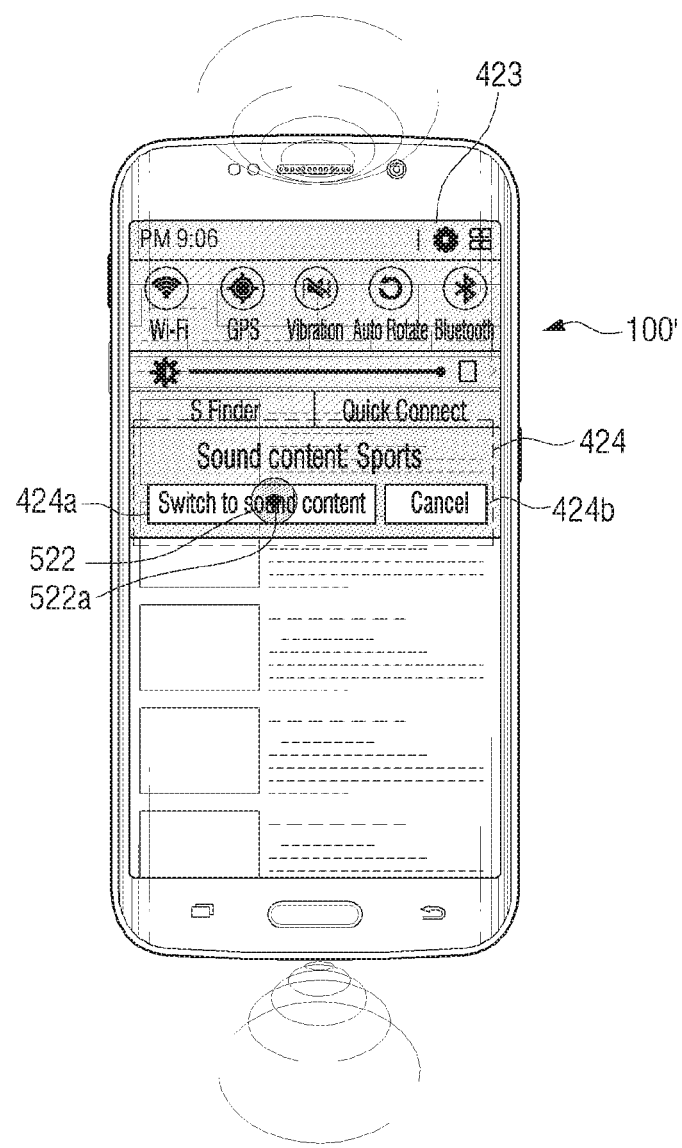
Figure 6F:
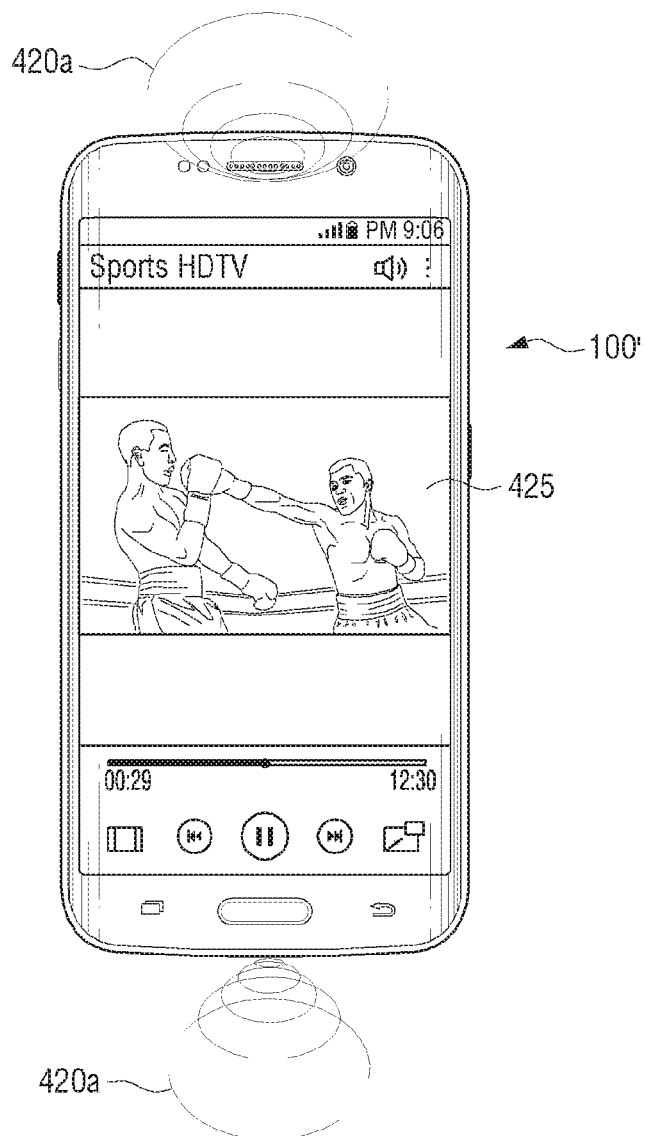
Figure 6G:
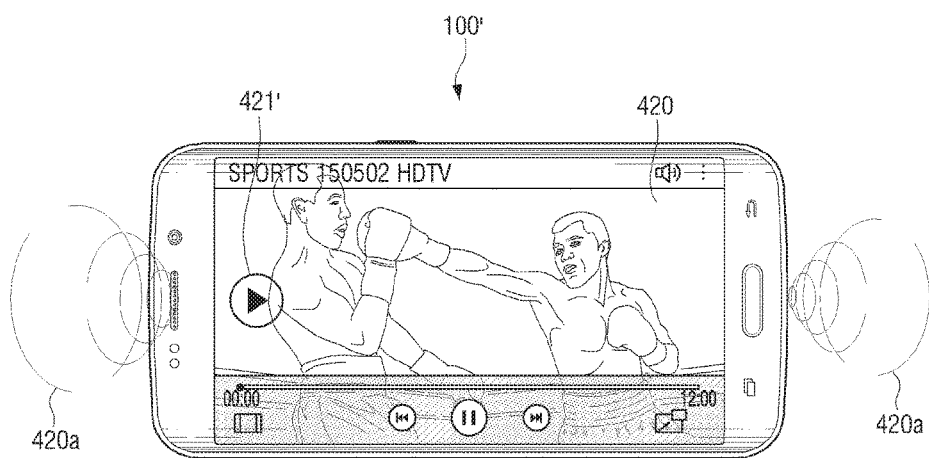

Referring to FIG. 6G, according to an embodiment, the controller 110 may display the floating button 421' in response to the #21 input on the screen of the electronic apparatus 100'. The floating button 421' may correspond to the sound stay of the electronic apparatus 100'. For example, the floating button 421' may be a play or reproduce button. When a user selects the floating button 421', the controller 110 may continuously output the #21 sound 420a through the speaker 176 in response to the selection of the floating button 421'.

The floating button 421' may be displayed on one side of the screen (e.g., one of the upper, lower, right and left sides). Further, the floating button 421' may be displayed on one of the corner areas (e.g., left upper corner area, right upper corner area, left lower corner area, and right lower corner area).

Because of its transparency, the floating button 421' may be overlapped with the #21 content 420 displayed on the electronic apparatus 100'. The transparency may be established to be 1% to 99%, for example, by a manufacturer or a user.

At operation S324 of FIG. 3C, the #22 input may be received by the pop-up window.

Referring to FIG. 6C, a user may perform the #22 input 521 (or #22 touch) on the implementing 421a of the sound stay the pop-up window 421.

The controller 110 may detect the #22 input 521 from the implementing 421a of the sound stay the pop-up window 421 by using a touch screen and a touch screen controller. The controller 110 may calculate the #22 touch position 521a (e.g., X21 coordinate and Y21 coordinate) corresponding to the #22 input 521 detected from the implementing 421a of the sound stay the pop-up window 421 by using the electrical signal received from the touch screen controller.

The controller 110 may store the #22 touch position information corresponding to the #22 touch position 521a in the storage 180. The stored #22 touch position information may include the touch identifier (ID) for the record management, the touch position, the touch detection time, or the touch information (e.g., touch pressure, touch direction and touch keep time).

Figure 6H:
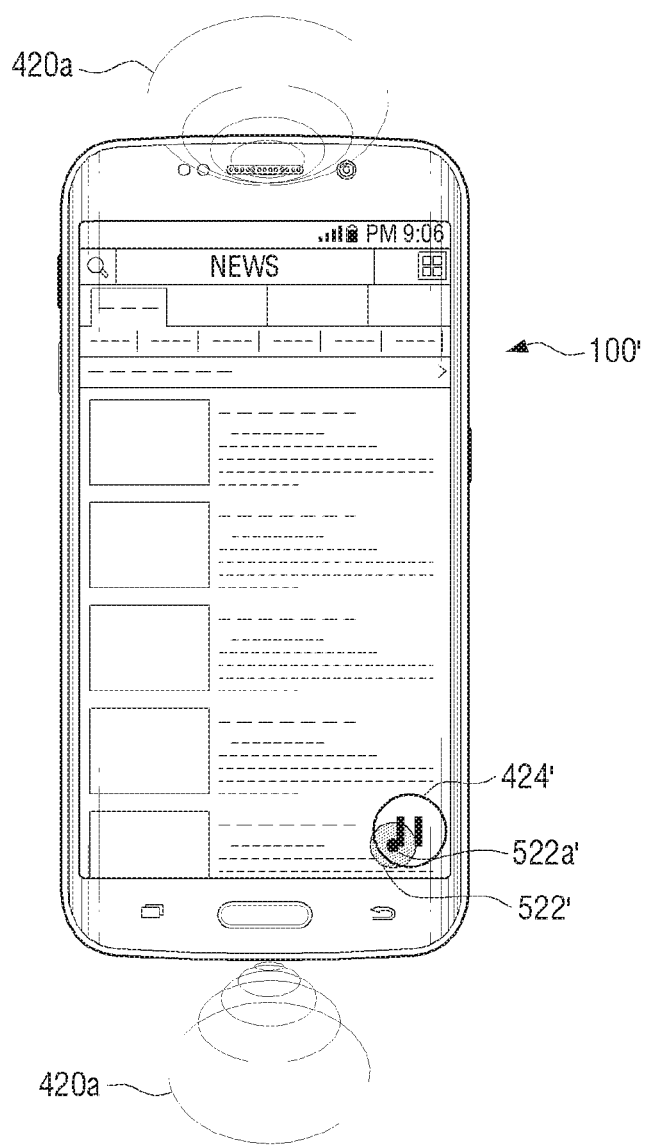

Referring to FIG. 6H, according to an embodiment, the controller 110 may display the floating button 424' on the screen of the electronic apparatus 100'. The floating button 424' may correspond to the switch to the sound content of the electronic apparatus 100'. For example, the floating button 424' may be a stop button. When a user selects 522' the floating button 424' (e.g., tap or double tap), the controller 110 may display the #21 content 420 on the screen in response to the selection of the floating button 424', and continuously output the #21 sound 420a through the speaker 176.

The floating button 424' may be displayed on one side of the screen (e.g., one of the upper, lower, right and left sides). Further, the floating button 424' may be displayed on one of the corner areas (e.g., left upper corner area, right upper corner area, left lower corner area, and right lower corner area).

Because of its transparency, the floating button 424' may be overlapped with the #21 content 420 displayed on the electronic apparatus 100'. The transparency may be established to be 1% to 99%, for example, by a manufacturer or a user.

At operation S325 of FIG. 3C, the #21 sound may be continuously output through the speaker.

Referring to FIG. 6D, the controller 110 may continuously output the #21 sound 420a through the speaker 176 in response to the #22 input 521. The controller 110 may output the #21 sound 420a through the speaker 176 until another user input is received.

At operation S326 of FIG. 3C, another application may be displayed on the screen of the electronic apparatus.

Referring to FIG. 6D, the controller 110 may display another application (e.g., web browser 422) on the screen. A user may select the web browser 422 among the displayed applications with the recent implementing app button 165b. Further, a user may select another application among a plurality of the applications displayed with the recent implementing app button 165b.

The controller 110 may display the web browser 422 (e.g., news site) on the display 170, and continuously output the #21 sound 420a through the speaker 176.

A user may confirm the state of the #21 content 420 corresponding to the #21 sound 420a through the speaker 176 while viewing the news.

At operation S327 of FIG. 3C, the #23 input may be received from a notification bar.

Referring to FIG. 6E, the controller 110 may display the notification bar 423. A user may perform the touch gestures (e.g., drag, flick and swipe, not illustrated) toward the screen direction from the upper side of the screen. The controller 110 may display the notification bar 423 in response to the touch gestures. The controller 110 may display the notification bar 423 to be overlapped with the web browser 422.

On the lower side of the notification bar 423, the notification area 424 corresponding to the sound stay may be displayed. The notification area 424 may include the switch to the sound content 424a and the cancel 424b of the sound content, which can be selected by a user.

The controller 110 may detect the #23 input 522 by the switch to the sound content 424a of the notification area 424 by using the touch screen controller. The controller 110 may calculate the #23 touch position 522a (e.g., X23 coordinate and Y23 coordinate) corresponding to the #23 input 522 detected from the switch to the sound content 424a of the notification area 424 within the notification bar 423 by using the electrical signal received from the touch screen controller.

The controller 110 may store the #23 touch position information corresponding to the #23 touch position 522a in the storage 180. The stored #23 touch position information may include the touch identifier (ID) for the record management, the touch position, the touch detection time or the touch information (e.g., touch pressure, touch direction and touch keep time).

At operation S328 of FIG. 3C, the return to the #21 content may be output on the screen of the electronic apparatus in response to the #23 input, and the #21 sound corresponding to the #21 content may be output through the speaker.

Referring to FIG. 6F, the controller 110 may return to the #21 content 420 on the display 170 of the electronic apparatus 100' and output the #21 sound 420a corresponding to the #21 content through the speaker 176 in response to the #23 input 522. The #21 content 420 may be included in the #21 content 420. When the #21 content 420 is reproduced, the new #21 content may be displayed.

When the electronic apparatus 100' stands toward the vertical portrait, the controller 110 may modify the direction of the #21 content 420 into the vertical portrait in response to the screen direction.

At operation S328 of FIG. 3C, when the #21 content is displayed on the screen of the electronic apparatus 100' and the #21 sound corresponding to the #21 content is output through the speaker 176, the method for controlling the sound of the electronic apparatus may be completed.

Figure 3D:
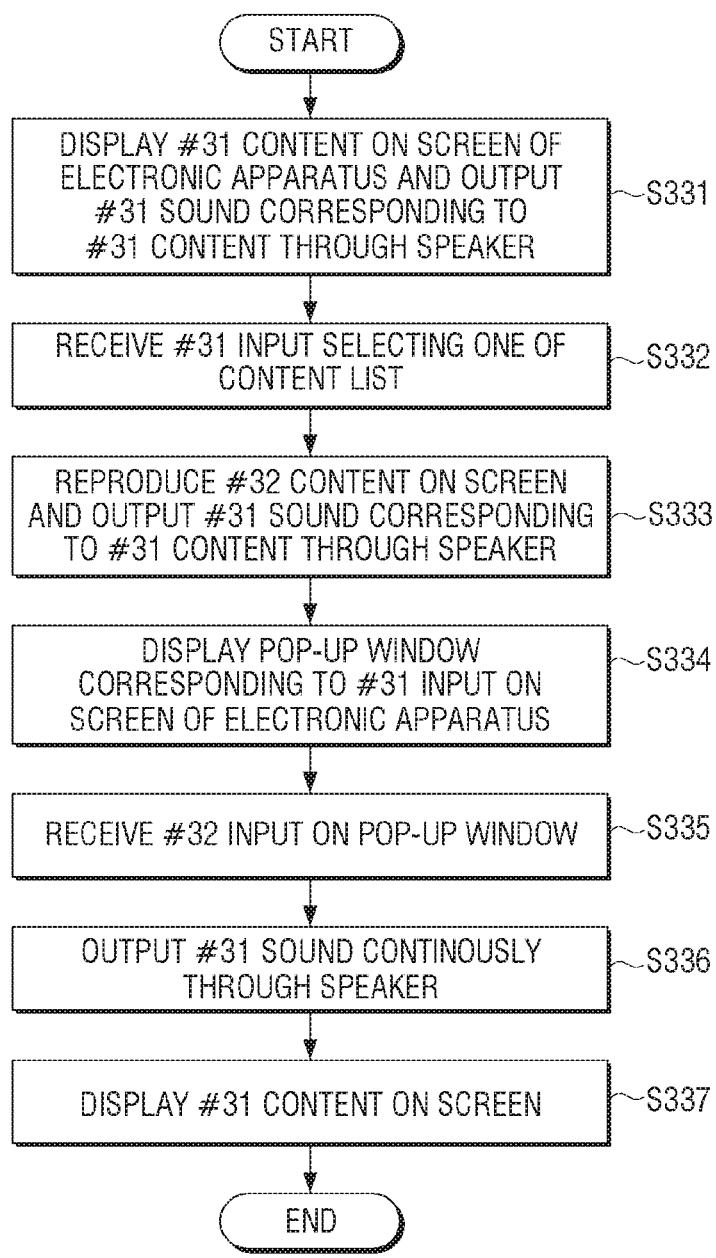
FIG. 3D is a flowchart schematically illustrating a method for controlling the sound of an electronic apparatus according to an exemplary embodiment.

FIG. 3D is a flowchart explaining the method for controlling the sound of the electronic apparatus according to an exemplary embodiment.

FIGS. 7A to 7D are diagrams schematically illustrating examples regarding the method for controlling the sound of the electronic apparatus according to an exemplary embodiment.

At operation S331 of FIG. 3D, the #31 content may be displayed on the screen of the electronic apparatus and the #31 sound corresponding to the #31 content may be output through the speaker.

Figure 7A:
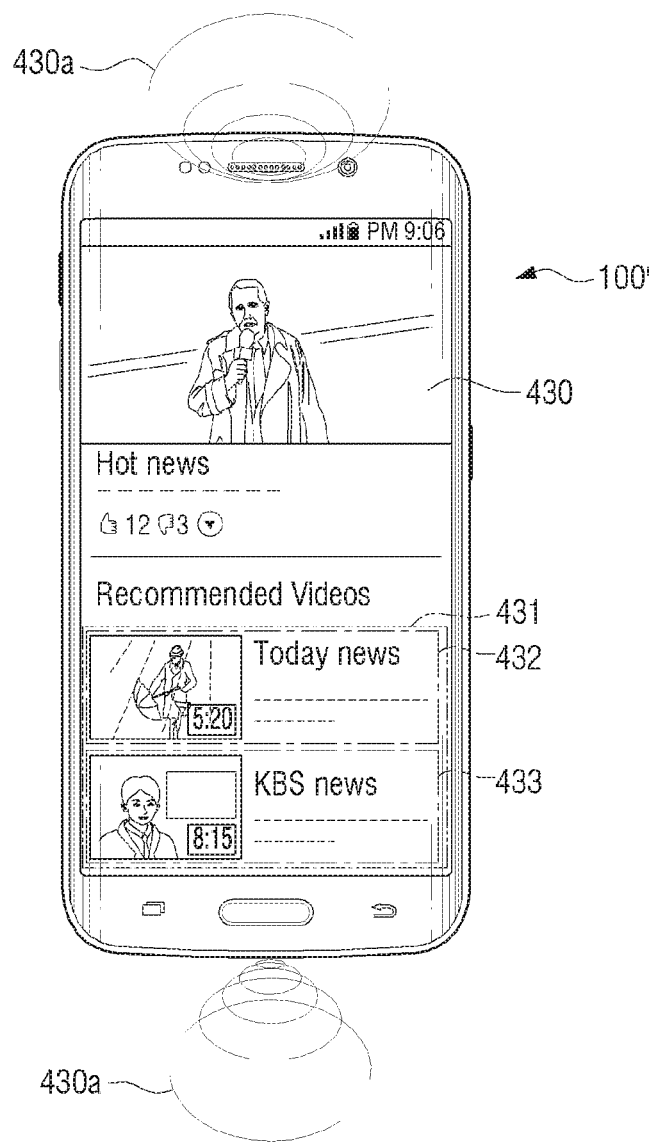
FIGS. 7A to 7D are diagrams schematically illustrating examples regarding a method for controlling the sound of an electronic apparatus according to an exemplary embodiment.

Referring to FIG. 7A, the electronic apparatus 100' may display the #31 content 430 on the screen (or the display 170) and output the #31 sound 430a corresponding to the #31 content through the speaker 176 under control of the controller 110. The content list 431 (e.g., video list) and the video site which can reproduce the selected content may be displayed on the screen of the electronic apparatus 100' through the web browser. A user may select one content (e.g., #31 content 430) on the content list 431. The #31 content 430 may be a concert content.

In response to the selection the #31 content 430 of a user, the controller 110 may display the #31 content 430 on one side of the screen, and output the #31 sound 430a through the speaker 176.

At operation S332 of FIG. 3D, the #31 input may be received by selecting one content of the content list.

Figure 7B:
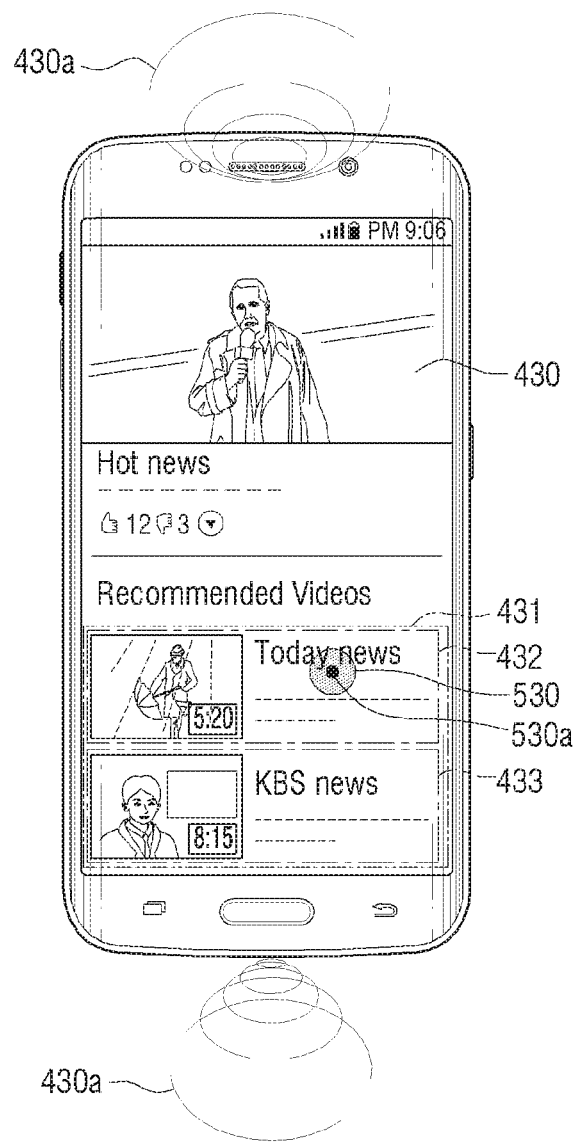

Referring to FIG. 7B, the #31 input 531 may be received by selecting one content (e.g., #32 content 432) of the content list 431.

A user may perform the #31 input 530 on one content (e.g., #32 content 432). For example, the #31 input 530 may be a long touch or a double tap. The long touch may correspond to keeping touching for the preset time (e.g., more than three seconds, modifiable) regarding the #32 content 432.

The controller 110 may detect the #31 input 530 by using the touch screen and the touch screen controller. The controller 110 may calculate the #31 touch position 530a (e.g., X31 coordinate and Y31 coordinate) corresponding to the #31 input 530 by using the electrical signal received from the touch screen controller.

The controller 110 may store the #31 touch position information corresponding to the #31 touch position 530a in the storage 180. The stored #31 touch position information may include the touch identifier (ID) for the record management, the touch position, the touch detection time, or the touch information (e.g., touch pressure, touch direction, and touch keep time).

At operation S333 of FIG. 3D, the #32 content may be reproduced on the screen and the #31 sound corresponding to the #31 content may be output through the speaker.

Figure 7C:
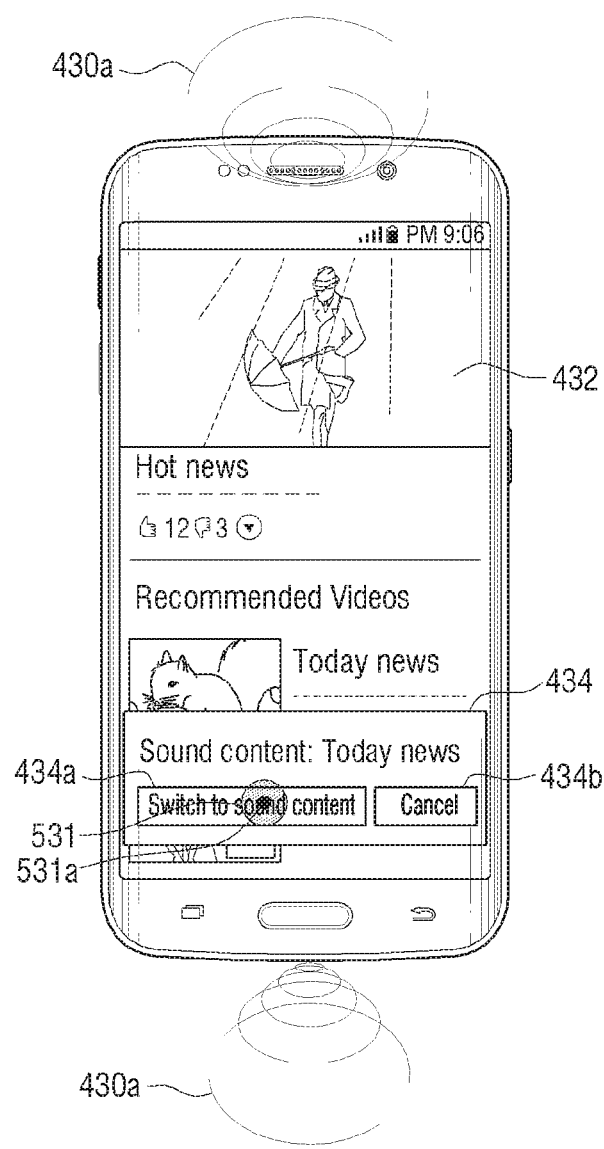

Referring to FIG. 7C, the controller 110 may reproduce the #32 content 432 instead of the #31 content 430, and output the #31 sound 430a corresponding to the #31 content 430 in response to the #31 input.

At operation S324 of FIG. 3D, the pop-up window corresponding to the #31 input may be displayed on the screen of the electronic apparatus.

Referring to FIG. 7C, the controller 110 may display the pop-up window 434 in response to the #31 input 530 on the screen of the electronic apparatus 100'. The pop-up window 434 may correspond to the sound stay of the electronic apparatus 100'.

The pop-up window 434 may be displayed on one side of the screen (e.g., one of the upper, lower, right and left sides). Further, the pop-up window 434 may be displayed on one of the corner areas on the screen (e.g., left upper corner area, right upper corner area, left lower corner area, and right lower corner area).

The size of the pop-up window 434 may be smaller than the size of the screen. The size of the pop-up window 434 may be more than 5% and less than 50% of the screen size.

The pop-up window 434 may include the switch to the sound content 434a and/or the cancel 434b of the sound stay, which can be selected by a user.

Because of the transparency, the pop-up window 434 may be overlapped with the content list 431. The transparency may be established to be 1% to 99%, for example, by a manufacturer or a user.

At operation S335 of FIG. 3D, the #32 input may be received by the pop-up window.

Referring to FIG. 7C, a user may perform the #32 input 531 (or #32 touch) on the switch to the sound content 434a of the pop-up window 434.

The controller 110 may detect the #32 input 531 from the switch to the sound content 434a of the pop-up window 434 by using the touch screen and the touch screen controller. The controller 110 may calculate the #32 touch position 531a (e.g., X32 coordinate and Y32 coordinate) corresponding to the #32 input 531 detected from the switch to the sound content 434a of the pop-up window 434 by using the electrical signal received from the touch screen controller.

The controller 110 may store the #32 touch information corresponding to the #32 touch position 531a in the storage 180. The stored #32 touch position information may include the touch identifier (ID) for the record management, the touch position, the touch detect time, or the touch information (e.g., touch pressure, touch direction and touch keep time).

At operation S336 of FIG. 3D, the #31 sound may be continuously output through the speaker.

Figure 7D:

Referring to FIG. 7D, the controller 110 may continuously output the #31 sound 430a through the speaker 176 in response to the #32 input 531. The controller 110 may output the #31 sound 430a through the speaker 176 until another user input is received.

At operation S326 of FIG. 3D, the #31 content may be displayed on the screen.

Referring to FIG. 7D, the controller 110 may return to the #31 content 430 on the display 170 of the electronic apparatus 100' and continuously output the #31 sound 430a corresponding to the #31 content through the speaker 176 in response to the #32 input 531.

At operation S337 of FIG. 3D, when the #31 content is displayed on the screen of the electronic apparatus 100' and the #31 sound corresponding to the #31 content is output through the speaker 176, the method for controlling the sound of the electronic apparatus may be completed.

The methods according to an embodiment may be configured as computer program or a program command format which can be executed via a computer, a processor, an integrated circuit and the like, and stored in non-transitory computer readable recording medium.

Non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disk, USB, memory card, or ROM.

Further, the foregoing exemplary embodiments and advantages are merely exemplary and are not to be construed as limiting the exemplary embodiments. The present teaching can be readily applied to other types of apparatuses. Also, the description of the exemplary embodiments of the present disclosure is intended to be illustrative, and not to limit the scope of the claims.

What is claimed is:

1. An electronic apparatus comprising:
a receiver;
a display configured to display content;
a speaker configured to output sound;
a communicator configured to receive information from an external remote control device; and
a processor configured to:
control the receiver to receive a first content and a first sound corresponding to the first content from a first broadcast channel,
control the display to display the first content on an entire screen of the display and the speaker to output the first sound,
based on receiving, through the communicator, first control information from the external remote control device while the first content is displayed and the first sound is output, control the receiver to receive a second content and a second sound corresponding to the second content from a second broadcast channel while maintaining receiving the first content and the first sound from the first broadcast channel, the first control information comprising a combinational control command input through a channel changing button and a volume removal button that are included in the external remote control device to (a) change a display of the first content of the first broadcast channel to a display of the second content of the second broadcast channel and (b) continue outputting the first sound corresponding to the first broadcast channel, and
based on the combinational control command, control the display to display the second content on the entire screen of the display, in place of displaying the first content, and control the speaker to output the first sound without outputting the second sound.

2. The electronic apparatus of claim 1, wherein the communicator comprises an optical receiver, and
wherein the processor is configured to control the optical receiver to receive the first control information.

3. The electronic apparatus of claim 1, wherein the processor is configured to control the display to display a pop-up window together with the second content based on the communicator receiving the first control information.

4. The electronic apparatus of claim 3, wherein the processor is configured to control the display to display the pop-up window to be overlapped with the second content based on the communicator receiving the first control information.

5. The electronic apparatus of claim 1, wherein the processor is configured to, based on the communicator receiving second control information from the external remote control device, control the display to display a pointer that moves on the display according to a movement of the external remote control device.

6. The electronic apparatus of claim 5, wherein the communicator comprises an optical receiver, and
wherein the processor is configured to control the optical receiver to receive the second control information.

7. The electronic apparatus of claim 5, wherein the second control information comprises control information corresponding to the movement of the external remote control device.

8. The electronic apparatus of claim 5, wherein the processor is configured to, based on the communicator receiving third control information received from the external remote control device, control the display to display the first content and control the speaker to continuously output the first sound.

9. The electronic apparatus of claim 5, wherein the processor is configured to, based on the communicator receiving fourth control information received from the external remote control device, control the display to continuously display the second content and control the speaker to output the second sound corresponding to the second content.

10. The electronic apparatus of claim 1, wherein the speaker is disposed externally to the electronic apparatus and is connected to the electronic apparatus by a wire or wirelessly.

11. The electronic apparatus of claim 3, wherein the processor is further configured to control the display to display a user interface (UI) in the pop-up window, and
based on receiving, from the external remote control device, a selection input through the UI, the processor is further configured to control the speaker to start outputting the second sound corresponding to the second content.

12. The electronic apparatus of claim 1, wherein the processor is further configured to, based on the receiving the first control information, execute a sound stay function,
wherein, based on the sound stay function being executed, a displayed content of a previously displayed broadcast channel is switched to the content of a newly received broadcast channel and the sound of the previously displayed broadcast channel is maintained,
wherein the displayed content and the sound of the previously displayed broadcast channel are the first content and the first sound of the first broadcast channel, and
wherein the content of the newly received broadcast channel is the second content of the second broadcast channel.

13. The electronic apparatus of claim 3, wherein the processor is further configured to:
control the display to display a user interface (UI) in the pop-up window, and
based on receiving, from the external remote control device, a selection input through the UI, control the display to display the first content on the entire screen of the display, in place of displaying the second content, and control the speaker to continue outputting the first sound.

* * * * *